(12) United States Patent
Atarashi et al.

(10) Patent No.: US 7,755,314 B2
(45) Date of Patent: Jul. 13, 2010

(54) ELECTRIC-MOTOR-EQUIPPED VEHICLE

(75) Inventors: Hirofumi Atarashi, Shioya-gun (JP); Hiroyuki Isegawa, Sakura (JP); Hiromitsu Sato, Utsunomiya (JP); Masaaki Kaizuka, Utsunomiya (JP); Shoei Abe, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/281,108

(22) PCT Filed: Feb. 19, 2007

(86) PCT No.: PCT/JP2007/052963
§ 371 (c)(1),
(2), (4) Date: Aug. 28, 2008

(87) PCT Pub. No.: WO2007/105415
PCT Pub. Date: Sep. 20, 2007

(65) Prior Publication Data
US 2009/0001914 A1    Jan. 1, 2009

(30) Foreign Application Priority Data
Feb. 28, 2006 (JP) .............. 2006-052045

(51) Int. Cl.
  H02K 23/00 (2006.01)
(52) U.S. Cl. .............. 318/437; 318/492; 318/9
(58) Field of Classification Search .......... 318/437, 318/492, 9; 310/156.08, 156.38, 209
See application file for complete search history.

(56) References Cited

U.S. PATENT DOCUMENTS

2002/0023791 A1  2/2002  Kima et al.
2005/0228554 A1  10/2005 Yamamoto et al.
2006/0063639 A1  3/2006  Tatara et al.
2009/0015090 A1* 1/2009  Kimura et al. ......... 310/156.08

FOREIGN PATENT DOCUMENTS

| EP | 1018451 A1 | 7/2000 |
| EP | 1085644 A2 | 3/2001 |
| FR | 2831345 A1 | 4/2003 |
| JP | 2002-147596 A | 5/2002 |
| JP | 2002-204541 A | 7/2002 |
| JP | 2004-72978 A | 3/2004 |
| JP | 2004-169782 A | 6/2004 |
| JP | 2004-260970 A | 9/2004 |
| JP | 2005-304182 A | 10/2005 |

OTHER PUBLICATIONS

European Search Report dated Mar. 4, 2009, issued in corresponding European Patent Application No. 07714489.7.
International Search Report of PCT/JP2007/052963, date of mailing May 15, 2007.

* cited by examiner

*Primary Examiner*—Karen Masih
(74) *Attorney, Agent, or Firm*—Westerman, Hattori, Daniels & Adrian, LLP

(57) ABSTRACT

An electric-motor-equipped vehicle of the present invention includes an electric motor which receives a power supply from a storage apparatus and drives the vehicle, or assists a driving of the vehicle by an internal combustion engine. The electric motor includes: an inner circumference side rotor and an outer circumference side rotor which are each provided with magnet pieces, and rotation axes of which are coaxially arranged; a stator which is arranged on an outer circumferential side or an inner circumferential side of the inner circumference side rotor and the outer circumference side rotor; and a phase modification device capable of modifying a relative phase between the inner circumference side rotor and the outer circumference side rotor.

3 Claims, 15 Drawing Sheets

ELECTRIC-MOTOR-EQUIPPED VEHICLE

TECHNICAL FIELD

The present invention relates to an electric-motor-equipped vehicle.

Priority is claimed on Japanese Patent Application No. 2006-052045, filed on Feb. 28, 2006, the contents of which are incorporated herein by reference.

BACKGROUND ART

Conventionally, there is known an electric motor having first and second rotors which are coaxially provided around the rotation axis of the electric motor, in which the relative position, that is, the phase difference between the first and second rotors is controlled according to the rotational speed of the electric motor or to the speed of the rotational magnetic field generated in the stator (for example, see Patent Document 1).

In the electric motor, when the phase difference is controlled according to, for example, the rotational speed of the electric motor, the relative position in the circumferential direction between the first and second rotors is modified via a member which is displaced in the radial direction by the action of centrifugal force. Alternatively, when the phase difference is controlled according to, for example, the speed of the rotational magnetic field generated in the stator, a control current is passed through the winding of the stator in a state with the rotational speeds of the respective rotors maintained by centrifugal force, to thereby modify the speed of the rotational magnetic field. Thus, the relative position in the circumferential direction between the first and second rotors is modified.

Patent Document 1: Japanese Unexamined Patent Application, First Publication No. 2002-204541

In an electric motor according to one example of the above-mentioned conventional technique, when the phase difference between the first and second rotors is controlled according to the rotational speed of the electric motor, the control over the phase difference between the first and second rotors is possible only while centrifugal force according to the operational state, that is, the rotational speed, of the electric motor is applied. Therefore, there arises a problem that it is impossible to control the phase difference at an appropriate timing including a halt state of the electric motor. Furthermore, when the electric motor is likely to be subjected to vibrations from the outside, such as when the electric motor is mounted in a vehicle as a driving source, there arises a problem that it is difficult to appropriately control the phase difference between the first and second rotors only by the action of centrifugal force. In addition, in this case, the phase difference is controlled irrespective of a variation in the supply voltage in the power source to the electric motor. Therefore, there is a possibility that an unfavorable situation is brought about in which the relationship of the supply voltage and the counter electromotive voltage is reversed.

Moreover, when the phase difference is controlled according to, for example, the speed of the rotational magnetic field generated in the stator, the speed of the rotational magnetic field is modified. Therefore, there arises a problem that the control processing of the electric motor becomes complicated.

DISCLOSURE OF INVENTION

The present invention has been achieved in view of the above circumstances, and has an object to provide an electric-motor-equipped vehicle which easily and appropriately makes an induced voltage constant variable while suppressing complex constructions of the electric motor and the electric-motor-equipped vehicle, to thereby make it possible to extend an operational range of the rotation rate and an operational range of torque for improvement of operation efficiency, and also to extend a high-efficient operational range.

To solve the above problems and achieve such an object, the present invention has adopted the following constructions:

(1) An electric-motor-equipped vehicle including an electric motor which receives a power supply from a storage apparatus and drives the vehicle, or assists a driving of the vehicle by an internal combustion engine, wherein the electric motor includes: an inner circumference side rotor and an outer circumference side rotor which are each provided with magnet pieces, and rotation axes of which are coaxially arranged; a stator which is arranged on an outer circumferential side or an inner circumferential side of the inner circumference side rotor and the outer circumference side rotor; and a phase modification device capable of modifying a relative phase between the inner circumference side rotor and the outer circumference side rotor.

According to the electric-motor-equipped vehicle of the above (1), for an electric motor which drives a vehicle or assists the driving of the vehicle by an internal combustion engine, the relative position between magnet pieces of an inner circumference side rotor and magnet pieces of an outer circumference side rotor can be modified with superior efficiency. As a result, for example, the linkage flux amount with which a field flux by the magnet pieces of the outer circumference side rotor crosses a stationary part winding can be actively increased or decreased with superior efficiency by means of a field flux by the magnet pieces of the inner circumference side rotor. Furthermore, for example, in a field strengthening state, a torque constant (that is, torque/phase current) of the electric motor can be set to a relatively high value. Therefore, without decreasing the current loss in operation of the electric motor, or without modifying a maximum value of an output current of an inverter which controls an application of a current to the stationary part winding, a maximum torque value which is output by the electric motor can be increased, and a maximum value of an operational efficiency of the electric motor can be increased to expand a high-efficiency region where the operational efficiency is greater then or equal to a predetermined efficiency.

In addition, a stepless state change between a field strengthening state and a field weakening state which is developed by the field flux of the magnet pieces of the inner circumference side rotor with respect to the field flux of the magnet pieces of the outer circumference side rotor can be set, and hence an induced voltage constant of the electric motor can be steplessly changed to an appropriate value. As a result, the operable rotation rate and a value of operable torque of the electric motor can be steplessly modified, and the ranges of the operable rotation rate and the operable torque can be expanded.

(2) An electric-motor-equipped vehicle including an electric motor which receives a power supply from a storage apparatus and starts an internal combustion engine which drives the vehicle, wherein the electric motor includes: an inner circumference side rotor and an outer circumference side rotor which are each provided with magnet pieces, and rotation axes of which are coaxially arranged; a stator which is arranged on an outer circumferential side or an inner circumferential side of the inner circumference side rotor and the outer circumference side rotor; and a phase modification device capable of modifying a relative phase between the inner circumference side rotor and the outer circumference side rotor.

According to the electric-motor-equipped vehicle of the above (2), for an electric motor which starts an internal combustion engine, the relative position between magnet pieces of an inner circumference side rotor and magnet pieces of an outer circumference side rotor can be modified with superior efficiency. As a result, for example, the linkage flux amount with which a field flux by the magnet pieces of the outer circumference side rotor crosses a stationary part winding can be actively increased or decreased with superior efficiency by means of a field flux by the magnet pieces of the inner circumference side rotor. Furthermore, for example, in a field strengthening state, a torque constant (that is, torque/phase current) of the electric motor can be set to a relatively high value. Therefore, without decreasing the current loss in operation of the electric motor, or without modifying a maximum value of an output current of an inverter which controls an application of a current to the stationary part winding, a maximum torque value which is output by the electric motor can be increased, and a maximum value of an operational efficiency of the electric motor can be increased to expand a high-efficiency region where the operational efficiency is greater than or equal to a predetermined efficiency.

In addition, a state change between a field strengthening state and a field weakening state which is developed by the field flux of the magnet pieces of the inner circumference side rotor with respect to the field flux of the magnet pieces of the outer circumference side rotor can be set steplessly, and hence an induced voltage constant of the electric motor can be steplessly changed to an appropriate value. As a result, the operable rotation rate and a value of operable torque of the electric motor can be steplessly modified, and ranges of the operable rotation rate and the operable torque can be expanded.

(3) In the above-mentioned (1) or (2), the magnet pieces of the inner circumference side rotor and the magnet pieces of the outer circumference side rotor may be arranged so that with a rotation of at least either one of the inner circumference side rotor and the outer circumference side rotor by the phase modification device, longer edges of the magnet pieces of the inner circumference side rotor and longer edges of the magnet pieces of the outer circumference side rotor are opposed to each other in a cross section perpendicular to a direction parallel to the rotation axis.

According to the electric-motor-equipped vehicle of the above (3), in the inner circumference side rotor and the outer circumference side rotor which are each provided with magnet pieces substantially rectangular in cross section perpendicular to the direction parallel to the rotation axis, the longer edges of the magnet pieces of the inner circumference side rotor and the longer edges of the magnet pieces of the outer circumference side rotor can be arranged so as to be opposed to each other along the radial direction when a relative phase between the inner circumference side rotor and the outer circumference side rotor are modified by the rotation device. As a result, for example, the linkage flux amount with which a field flux by the magnet pieces on the outer circumference side crosses a stationary part winding can be increased or decreased with superior efficiency by means of a field flux by the magnet pieces on the inner circumference side.

(4) In the above (1) or (2), the phase modification device may modify the relative phase between the inner circumference side rotor and the outer circumference side rotor, in accordance with an operational status of the electric-motor-equipped vehicle.

According to the electric-motor-equipped vehicle of the above (4), an induced voltage constant of the electric motor can be steplessly changed to an appropriate value, in accordance with an operational status of the vehicle. Therefore, an increase in power consumption for current supply control over the electric motor can be suppressed.

(5) In the above (4), the phase modification device may modify the relative phase between the inner circumference side rotor and the outer circumference side rotor, in accordance with a gear ratio of a transmission.

According to the electric-motor-equipped vehicle of the above (5), an induced voltage constant of the electric motor can be steplessly changed to an appropriate value, in accordance with a gear ratio of the transmission of the vehicle. Therefore, an increase in power consumption for current supply control over the electric motor can be suppressed.

(6) In the above (5), the phase modification device may modify the relative phase between the inner circumference side rotor and the outer circumference side rotor so that a mutually field weakening state is developed by a field flux from the magnet pieces of the inner circumference side rotor and a field flux from the magnet pieces of the outer circumference side rotor, when a gear ratio of a transmission is less than a predetermined value.

According to the electric-motor-equipped vehicle of the above (6), in the vehicle provided with an internal combustion engine as a driving source, if a gear ratio of a transmission is less than a predetermined gear ratio, that is, in the side of high gear, the driving efficiency of the internal combustion engine is relatively increased. Therefore, when the driving force of the internal combustion engine is preferentially used to run the vehicle, the electric motor is set to a field weakening state, to thereby make it possible to suppress the generation of a braking action on the vehicle due to the counter electromotive voltage of the electric motor.

(7) In the above (5), the phase modification device may modify the relative phase between the inner circumference side rotor and the outer circumference side rotor so that a mutually field weakening state is developed by a field flux from the magnet pieces of the inner circumference side rotor and a field flux from the magnet pieces of the outer circumference side rotor, when a variation in gear ratio of a transmission is greater than or equal to a predetermined value.

According to the electric-motor-equipped vehicle of the above (7), if a variation in gear ratio is greater than or equal to a predetermined value, in other words, the state of the transmission is shifted from a relatively small gear ratio state (high-gear) to a relatively large gear ratio state (low-gear), the electric motor is set to the field weakening state, to thereby make it possible to suppress the generation of an overcharge and an inrush current to the electrical equipment due to a regenerative operation by the electric motor.

(8) In the above (1) or (2), the electric motor may include: an oil channel which is provided in an inside portion of an inner circumference side end face plate provided in the inner circumference side rotor, and which has a first end portion to which a hydraulic pressure is supplied and a second end portion which opens on an outer circumferential face of the inner circumference side end face plate; a movable pin member which is contained in the second end portion, and is capable of protruding from an opening end of the second end portion to an outside by the hydraulic pressure; and a container hole which is provided on an inner circumferential face of an outer circumference side end face plate provided in the outer circumference side rotor, and which is capable of containing a tip portion of the movable pin member protruding from the outer circumferential face of the inner circumference side end face plate.

According to the electric-motor-equipped vehicle of the above (8), for example, when the tip portion of the movable pin, which protrudes from the inner circumference side end face plate, is contained in the container hole of the outer circumference side end face plate, it is possible to constitute the field so that a mutually field weakening state is developed by a field flux by the magnet pieces of the inner circumference side rotor and a field flux by the magnet pieces of the outer circumference side rotor. As a result, it is possible to easily change the induced voltage constant of the electric motor from a field strengthening state, which corresponds to a state where the tip portion of the movable pin member is not contained in the container hole, to a field weakening state.

(9) In the above (1) or (2), the electric motor may include: a plurality of oil channels which are provided in an inside portion of an inner circumference side end face plate provided in the inner circumference side rotor, and which each have a first end portion to which a hydraulic pressure is supplied and a second end portion opening at a respective position along a circumferential direction on an outer circumferential face of the inner circumference side end face plate; a plurality of movable pin members which are each contained in the second end portions, and are each capable of protruding from respective opening ends of the second end portions to an outside by the hydraulic pressure; and a plurality of container holes which are provided on an inner circumferential face of an outer circumference side end face plate provided in the outer circumference side rotor, and which are each capable of containing the respective tip portion of the respective movable pin member protruding from the outer circumferential face of the inner circumference side end face plate.

According to the electric-motor-equipped vehicle of the above (9), for example, when the respective tip portions of the movable pins, which protrude from the inner circumference side end face plate, is contained in each container hole of the outer circumference side end face plate, it is possible to set a field to an appropriate state ranging from a mutually field weakening state to a mutually field strengthening state which is developed by a field flux by the magnet pieces of the inner circumference side rotor and a field flux by the magnet pieces of the outer circumference side rotor. As a result, it is possible to appropriately set a state change between a field strengthening state, which corresponds to a state where the tip portions of the movable pin members are not contained in the container holes, and a field weakening state in a stepwise manner.

(10) An electric-motor-equipped vehicle including: an internal combustion engine serving as a driving source of drive a wheel on one of a front wheel side or a rear wheel side; and an electric motor which is driven by a power supply from a storage apparatus and serves as a driving source for drive wheels on the other, wherein the electric motor comprises: an inner circumference side rotor and an outer circumference side rotor which are each provided with magnet pieces, and rotation axes of which are coaxially arranged; a stator which is arranged on an outer circumferential side or an inner circumferential side of the inner circumference side rotor and the outer circumference side rotor; and a phase modification device capable of modifying a relative phase between the inner circumference side rotor and the outer circumference side rotor.

According to the electric-motor-equipped vehicle of the above (10), an induced voltage constant of the electric motor can be steplessly changed to an appropriate value in accordance with an operational status of the vehicle capable of all-wheel drive. As a result, an increase in power consumption for current supply control over the electric motor can be suppressed.

(11) An electric-motor-equipped vehicle including: a first electric motor which is driven by a power supply from a storage apparatus and serves as a driving source of a drive wheel on one of a front wheel side or a rear wheel side; and a second electric motor which is driven by a power supply from a storage apparatus and serves as a driving source of drive wheels on the other, wherein at least either one of the first electric motor and the second electric motor comprises: an inner circumference side rotor and an outer circumference side rotor which are each provided with magnet pieces, and rotation axes of which are coaxially arranged; a stator which is arranged on an outer circumferential side or an inner circumferential side of the inner circumference side rotor and the outer circumference side rotor; and a phase modification device capable of modifying a relative phase between the inner circumference side rotor and the outer circumference side rotor.

According to the electric-motor-equipped vehicle of the above (11), an induced voltage constant of the electric motor can be steplessly changed to an appropriate value in accordance with an operational status of the vehicle capable of all-wheel drive. Therefore, an increase in power consumption for current supply control over the electric motor can be suppressed.

(12) An electric-motor-equipped vehicle including: a first electric motor which is driven by a power supply from a storage apparatus and serves, together with an internal combustion engine, as a driving source for drive wheels on one of a front wheel side or a rear wheel side; and a second electric motor which is driven by a power supply from a storage apparatus and serves as a driving source for drive wheels on the other, wherein at least either one of the first electric motor and the second electric motor comprises: an inner circumference side rotor and an outer circumference side rotor which are each provided with magnet pieces, and rotation axes of which are coaxially arranged; a stator which is arranged on an outer circumferential side or an inner circumferential side of the inner circumference side rotor and the outer circumference side rotor; and a phase modification device capable of modifying a relative phase between the inner circumference side rotor and the outer circumference side rotor.

According to the electric-motor-equipped vehicle of the above (12), an induced voltage constant of the electric motor can be steplessly changed to an appropriate value in accordance with an operational status of the vehicle capable of all-wheel drive. Therefore, an increase in power consumption for current supply control over the electric motor can be suppressed.

(13) In the above (10) to (12), in a state driving the drive wheels on the front wheel side and the rear wheel side, the phase modification device may modify a relative phase between the inner circumference side rotor and the outer circumference side rotor so that a mutually field strengthening state is developed by a field flux from the magnet pieces of the inner circumference side rotor and a field flux from the magnet pieces of the outer circumference side rotor; and in a state driving the drive wheels on the front wheel side or the rear wheel side, the phase modification device may modify a relative phase between the inner circumference side rotor and the outer circumference side rotor so that a mutually field weakening state is developed by a field flux from the magnet pieces of the inner circumference side rotor and a field flux from the magnet pieces of the outer circumference side rotor.

According to the electric-motor-equipped vehicle of the above (13), in a drive state only with the drive wheels on the front wheel side or the rear wheel side, the electric motor in non-drive state can be set to a field weakening state. As a result, it is possible to suppress the generation of a braking operation on the vehicle due to the counter electromotive voltage of the electric motor.

According to the electric-motor-equipped vehicle of the above (1) of the present invention, for an electric motor which drives a vehicle or assists the driving of the vehicle by an internal combustion engine, the relative position between magnet pieces of an inner circumference side rotor and magnet pieces of an outer circumference side rotor can be modified with superior efficiency. As a result, the linkage flux amount with which a field flux by the magnet pieces of the outer circumference side rotor crosses a stationary part winding can be actively increased or decreased with superior efficiency by means of the field flux by the magnet pieces of the inner circumference side rotor. In addition, a state change between a field strengthening state and a field weakening state which is developed by the field flux of the magnet pieces of the inner circumference side rotor with respect to the field flux of the magnet pieces of the outer circumference side rotor can be set steplessly, and hence an induced voltage constant of the electric motor can be steplessly changed to an appropriate value.

According to the electric-motor-equipped vehicle of the above (2) of the present invention, for an electric motor which starts an internal combustion engine, the relative position between magnet pieces of an inner circumference side rotor and magnet pieces of an outer circumference side rotor can be modified with superior efficiency. As a result, the linkage flux amount with which a field flux by the magnet pieces of the outer circumference side rotor crosses a stationary part winding can be actively increased or decreased with superior efficiency by means of a field flux by the magnet pieces of the inner circumference side rotor. In addition, a state change between a field strengthening state and a field weakening state which is developed by the field flux of the magnet pieces of the inner circumference side rotor with respect to the field flux of the magnet pieces of the outer circumference side rotor can be set steplessly, and hence an induced voltage constant of the electric motor can be steplessly changed to an appropriate value.

According to the electric-motor-equipped vehicle of the above (3) of the present invention, the linkage flux amount with which a field flux by the outer circumference side permanent magnets crosses a stationary part winding can be increased or decreased with superior efficiency by means of a field flux by the inner circumference side permanent magnets.

According to the electric-motor-equipped vehicle of the above (4) of the present invention, an induced voltage constant of the electric motor can be steplessly changed to an appropriate value, in accordance with an operational status of the vehicle, and hence an increase in power consumption for current supply control over the electric motor can be suppressed.

According to the electric-motor-equipped vehicle of the above (5) of the present invention, an induced voltage constant of the electric motor can be steplessly changed to an appropriate value, in accordance with a gear ratio of a transmission of the vehicle. Therefore, an increase in power consumption for current supply control over the electric motor can be suppressed.

According to the electric-motor-equipped vehicle of the above (6) of the present invention, in a vehicle provided with an internal combustion engine as a driving source, if a gear ratio of a transmission is less than a predetermined gear ratio, that is, high-gear, the driving efficiency of the internal combustion engine is relatively increased. Therefore, when the driving force of the internal combustion engine is preferentially used to run the vehicle, the electric motor is set to a field weakening state, to thereby make it possible to suppress the generation of a braking action on the vehicle due to the counter electromotive voltage of the electric motor.

According to the electric-motor-equipped vehicle of the above (7) of the present invention, if a variation in gear ratio is greater than or equal to a predetermined value, in other words, the state of the transmission is shifted from a relatively small gear ratio state (high-gear) to a relatively large gear ratio state (low-gear), the electric motor is set to a field weakening state, to thereby make it possible to suppress the generation of an overcharge and an inrush current to the electrical equipment due to a regenerative operation by the electric motor.

According to the electric-motor-equipped vehicle of the above (8) of the present invention, while preventing the electric motor from becoming complex in configuration, it is possible to easily change an induced voltage constant of the electric motor from a field strengthening state to a field weakening state.

According to the electric-motor-equipped vehicle of the above (9) of the present invention, while preventing the electric motor from becoming complex in configuration, it is possible to stepwise change an induced voltage constant of the electric motor from the field strengthening state to the field weakening state.

According to the electric-motor-equipped vehicle of the above (10) to (12) of the present invention, an induced voltage constant of the electric motor can be steplessly changed to an appropriate value in accordance with an operational status of the vehicle capable of all-wheel drive. Therefore, an increase in power consumption for current supply control over the electric motor can be suppressed.

According to the electric-motor-equipped vehicle of the above (13) of the present invention, in a drive state only with the drive wheels on the front wheel side or the rear wheel side, the electric motor in non-drive state is set to a field weakening state, to thereby make it possible to suppress the generation of a braking operation on the vehicle due to the counter electromotive voltage of the electric motor.

DESCRIPTION OF THE REFERENCE SYMBOLS

Figure 1:
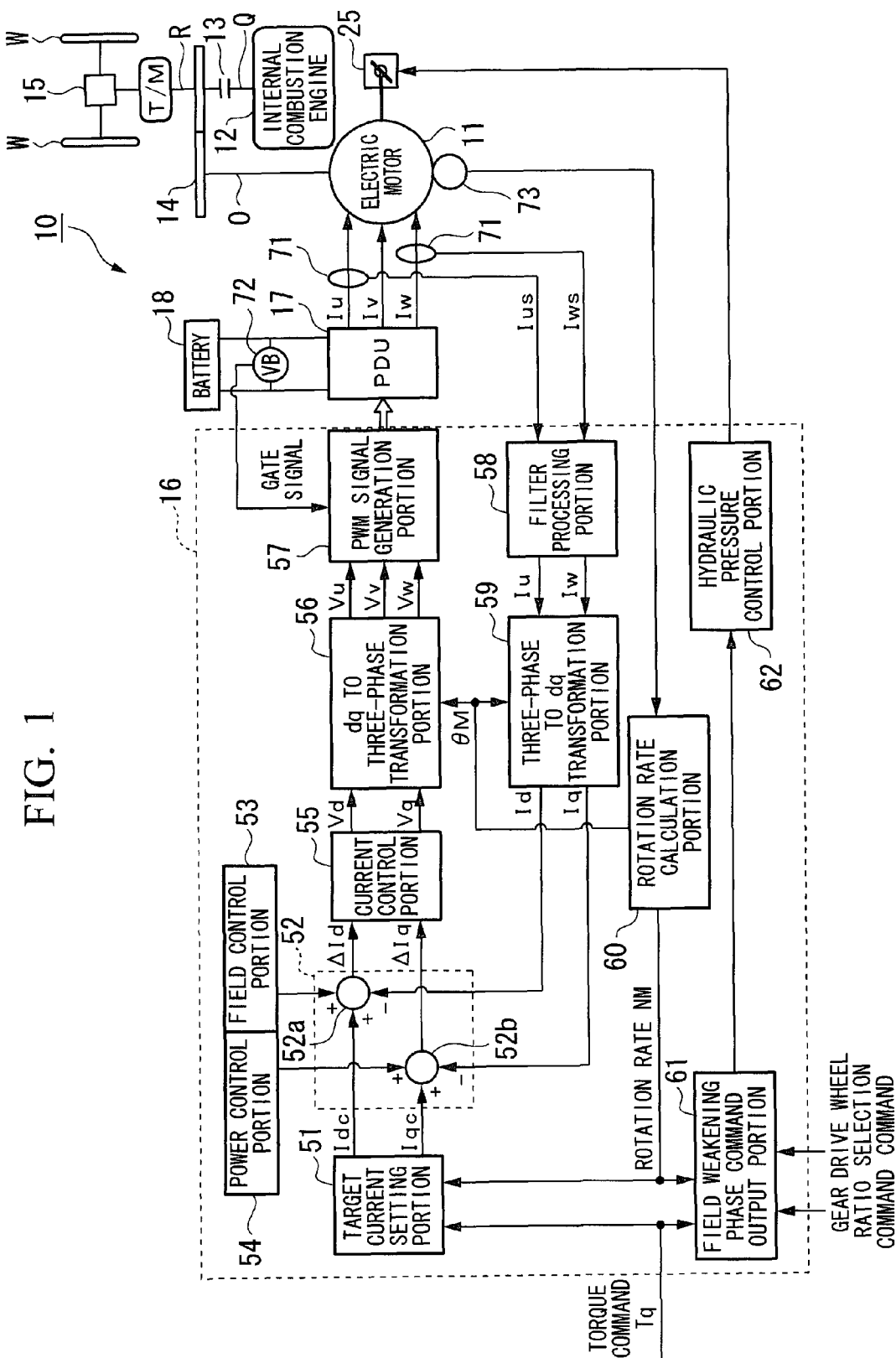
FIG. 1 is a block diagram of an electric-motor-equipped vehicle according to a first embodiment of the present invention.

10: electric-motor-equipped vehicle (vehicle)
12: internal combustion engine
18: battery (storage apparatus)
21: inner circumference side rotating part (inner circumference side rotor)
21a: inner circumference side permanent magnet (magnet piece)
22: outer circumference side rotating part (outer circumference side rotor)
22a: outer circumference side permanent magnet (magnet piece)
24: stationary part (stator)
25: phase control apparatus (phase modification device)
36: inner circumference side axis member (inner circumference side end face plate)
36A: outer circumferential face
37: outer circumference side end face member (outer circumference side end face plate)
37A: inner circumferential face
40: oil channel
40a: first end portion
40b: second end portion
41: movable pin (movable pin member)
43: container hole

BEST MODE FOR CARRYING OUT THE INVENTION

Hereunder is a description of one embodiment of an electric-motor-equipped vehicle according to the present invention, with reference to the appended drawings.

An electric-motor-equipped vehicle 10 (hereunder, referred simply as a vehicle 10) according to the embodiment is a hybrid vehicle provided with an electric motor 11 and an internal combustion engine 12 as driving sources, for example as shown in FIG. 1. Driving force(s) of at least either one of the electric motor 11 and the internal combustion engine 12 is (are) transmitted to drive wheels W via a transmission T/M.

In the vehicle 10, a rotation axis O of the electric motor 11 and an input axis R of the transmission T/M, which is connected to a crank axis Q of the internal combustion engine 12 via a clutch 13, are connected to each other via a motive force transmission mechanism 14, which transmits a motive force by means of, for example, a pair of engaging gears, a chain looped around gears which are integrally connected respectively to the axes O and R, or a belt looped around pulleys which are integrally connected respectively to the axes O and R. The respective driving forces of the electric motor 11 and the internal combustion engine 12 are transmitted to the drive wheels W of the vehicle 10 via a differential 15.

When a driving force is transmitted to the electric motor 11 from the drive wheels W side while the vehicle 10 is decelerating, the electric motor 11 functions as a generator. It generates so-called a regenerative braking force to recover the motive energy of the vehicle as electric energy (regenerative energy). Also when an output of the internal combustion engine 12 is transmitted to the electric motor 11 while the clutch 13 is set to a connected state, the electric motor 11 functions as a generator to generate power generation energy.

In the vehicle 10, drive and regenerative operations of the electric motor 11 with a plurality of phases (for example, three phases of: U phase, V phase, and W phase) are performed by a power drive unit (PDU) 17 on receiving a control command which is output from a control portion 16.

The PDU 17 includes a PWM inverter using a pulse width modification (PWM) provided with a bridge circuit which is formed of, for example, a plurality of bridged transistor switching elements. To the PDU 17, there is connected a high-voltage battery (storage apparatus) 18 for imparting/receiving electric energy to/from the electric motor 11.

The PDU 17 switches the on (conduction)/off (interruption) states of the paired transistors for every phase in the PWM inverter based on a gate signal (that is, a PWM signal), which is a switching command input from the control portion at a driving time of the electric motor 11 or other times, to thereby transform a direct current supplied from the battery 18 into a three-phase alternating current. It then sequentially rotates power application to stator windings for the three phases of the electric motor 11, to thereby pass U-phase current Iu, V-phase current Iv, and W-phase current Iw to the stator windings for the respective phases.

Figure 2:
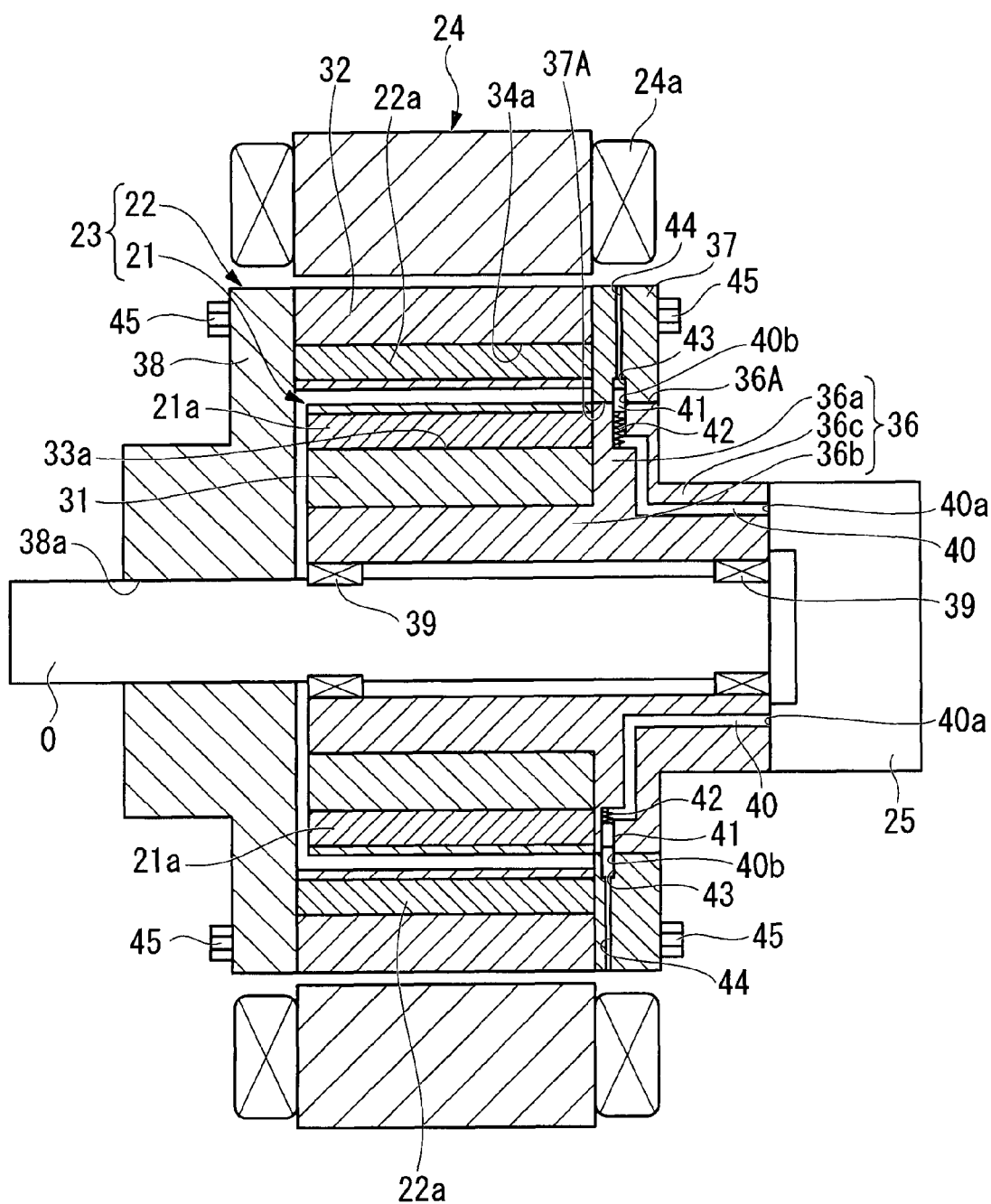
FIG. 2 is a cross-sectional view of the electric motor according to the same embodiment.
Figure 3:
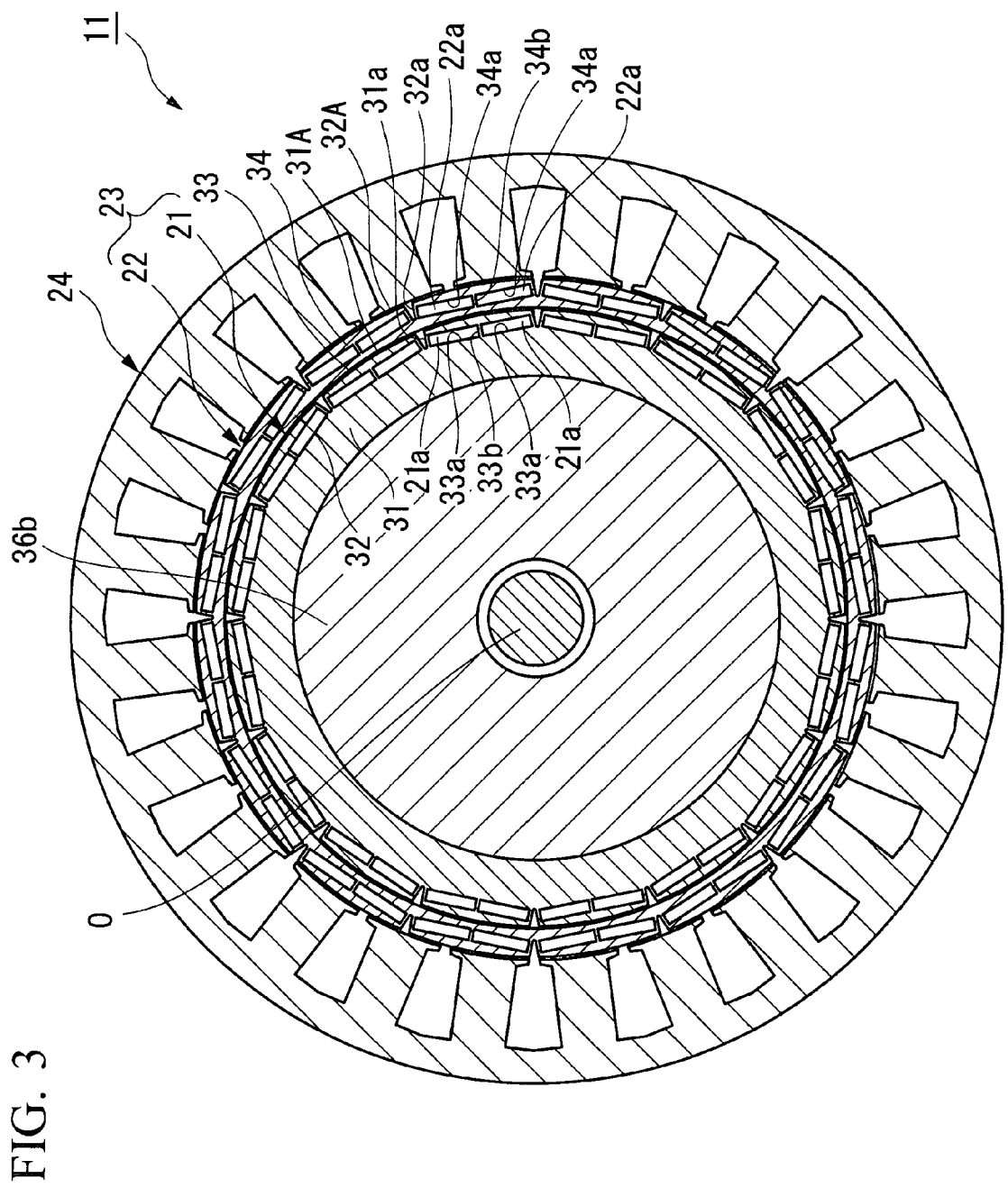
FIG. 3 is a cross-sectional view of a rotor of the electric motor according to the same embodiment.
Figure 4:
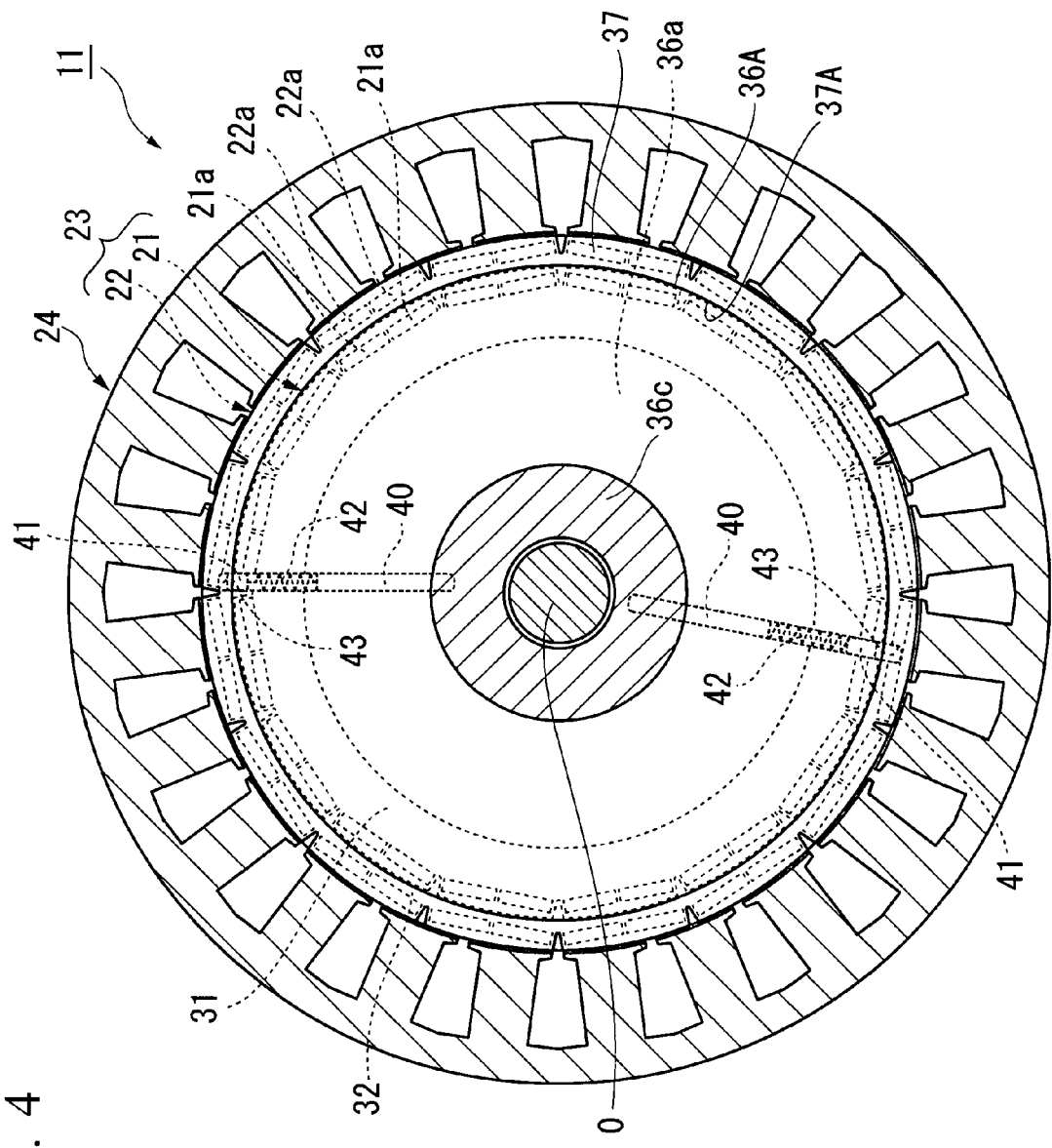
FIG. 4 is a planar view of the electric motor of the same embodiment, seen along the axis direction from one direction to the other direction.

The electric motor 11, as shown in FIG. 2 and FIG. 3, includes: a rotor 23 made of a substantially annular-shaped inner circumference side rotating part 21 and a substantially annular-shaped outer circumference side rotating part 22, each provided with permanent magnets 21*a* and permanent magnets 22*a* which are arranged along the circumferential direction; a stationary part 24 having a plurality of stationary part windings 24*a* with phases for generating a rotary magnetic field to rotate the rotor 23; a phase control apparatus 25 for controlling a relative phase between the inner circumference side rotating part 21 and the outer circumference side rotating part 22.

The inner circumference side rotating part 21 and the outer circumference side rotating part 22 are arranged so that their rotation axes are coaxial with a rotation axis O of the electric motor 11.

The inner circumference side rotating part 21 includes: a substantially cylindrical-shaped inner circumference side rotor iron core 31; and a plurality of inner circumference side magnet fitting portions 33 provided in an outer circumference portion of the inner circumference side rotor iron core 31, and spaced a predetermined distance apart in the circumferential direction.

The outer circumference side rotating part 22 includes: a substantially cylindrical-shaped outer circumference side rotor iron core 32; and a plurality of outer circumference side magnet fitting portions 34 provided inside the outer circumference side rotor iron core 32, and spaced a predetermined distance apart in the circumferential direction.

Between the inner circumference side magnet fitting portions 33 adjacent in the circumferential direction, there is formed a groove 31*a* extending parallel to the rotation axis O in an outer circumferential face 31A of the inner circumference side rotor iron core 31.

Between the outer circumference side magnet fitting portions 34 adjacent in the circumferential direction, there is formed a groove 32*a* extending parallel to the rotation axis O in an outer circumferential face 32A of the outer circumference side rotor iron core 32.

The magnet fitting portion 33 includes a pair of magnet fitting holes 33*a* penetrating parallel to the rotation axis O. The pair of magnet fitting holes 33*a* are arranged so as to be adjacent to each other in the circumferential direction with a center rib 33*b* therebetween.

The magnet fitting portion 34 includes a pair of magnet fitting holes 34*a* penetrating parallel to the rotation axis O. The pair of magnet fitting holes 34*a* are arranged so as to be adjacent to each other in the circumferential direction with a center rib 34*b* therebetween.

In each of the magnet fitting holes 33*a* and 34*a*, the cross section perpendicular to the direction parallel to the rotation axis O is formed in a substantially rectangular shape, with substantially the circumferential direction being its longitudinal direction, and substantially the radial direction being its latitudinal direction. In each of the magnet fitting holes 33*a*, there is fitted a substantially rectangular plate-shaped permanent magnet 21*a* extending parallel to the rotation axis O. In each of the magnet fitting holes 34*a*, there is fitted a substantially rectangular plate-shaped permanent magnet 22*a* extending parallel to the rotation axis O.

A pair of inner circumference side permanent magnets 21*a* which are fitted in a pair of magnet fitting holes 33*a* are set so as to be magnetized in the thickness direction (that is, in the radial direction of the rotating parts 21 and 22) to have the same magnetization direction. With respect to the inner circumference side magnet fitting portions 33 adjacent in the circumferential direction, the pairs of inner circumference side permanent magnets 21*a* are set to have magnetization directions different from each other. That is, an inner circumference side magnet fitting portion 33 fitted with a pair of inner circumference side permanent magnets 21*a* whose outer circumference sides are set to be N poles is adjacent in the circumferential direction to another inner circumference side magnet fitting portion 33 fitted with a pair of inner circumference side permanent magnets 21*a* whose outer circumference sides are set to be S poles, with the groove 31*a* therebetween.

Similarly, a pair of outer circumference side permanent magnets 22*a* which are fitted in a pair of magnet fitting holes 34*a* are set so as to be magnetized in the thickness direction (that is, in the radial direction of the rotating parts 21 and 22) to have the same magnetization direction. With respect to the outer circumference side magnet fitting portions 34 adjacent in the circumferential direction, the respective pair of outer circumference side permanent magnets 22*a* are set to have a magnetization direction different from each other. That is, an outer circumference side magnet fitting portion 34 fitted with a pair of outer circumference side permanent magnets 22*a* whose outer circumference side is set to be an N pole is adjacent in the circumferential direction to an outer circumference side magnet fitting portion 34 fitted with a pair of outer circumference side permanent magnets 22*a* whose outer circumference side is set to be an S pole, with the groove 32*a* therebetween.

Each magnet fitting portion 33 of the inner circumference side rotating part 21 and each magnet fitting portion 34 of the outer circumference side rotating part 22 are provided so that an facing arrangement in the radial direction of the rotating parts 21 and 22 is possible. Furthermore, each groove 31*a* of the inner circumference side rotating part 21 and each groove 32*a* of the outer circumference side rotating part 22 are provided so that an facing arrangement in a radial direction of the rotating parts 21 and 22 is possible.

As a result, depending on the relative position about the rotation axis O between the inner circumference side rotating part 21 and the outer circumference side rotating part 22, it is possible to set the state of the electric motor 11 to an appropriate state ranging: from a field weakening state in which the like-poles of the inner circumference side permanent magnets 21*a* of the inner circumference side rotating part 21 and the outer circumference side permanent magnets 22*a* of the outer circumference side rotating part 22 are arranged face-to-face (that is, the inner circumference side permanent magnets 21*a* and the outer circumference side permanent magnets 22*a* are arranged in the opposite pole direction); to a field strengthening state in which the unlike-poles of the inner circumference side permanent magnets 21a of the inner circumference side rotating part 21 and the outer circumference side permanent magnets 22a of the outer circumference side rotating part 22 are arranged face-to-face (that is, the inner circumference side permanent magnets 21a and the outer circumference side permanent magnets 22a are arranged in the same pole direction).

Especially, in the field weakening state and the field strengthening state, it is set such that the longer edges of inner circumference side permanent magnets 21a and the longer edges of the outer circumference side permanent magnets 22a are opposed to each other in their cross sections perpendicular to the direction parallel to the rotation axis O.

The inner circumference side rotating part 21 includes an inner circumference side axis member 36 that is formed integrally with: a substantially annular plate-shaped inner circumference side end face portion 36a which abuts one axis direction end portion of the inner circumference side rotor iron core 31; a substantially cylindrical-shaped inner circumference side axis portion 36b which is fitted on an inner circumference portion of the inner circumference side rotor iron core 31; and a substantially cylindrical-shaped inner circumference side axis end portion 36c which is connected to a phase control apparatus 25.

The outer circumference side rotating part 22 includes: a substantially annular plate-shaped outer circumference side end face member 37 which abuts one axis direction end portion of the outer circumference side rotor iron core 32; and a substantially annular plate-shaped outer circumference side axis member 38 which abuts the other axis direction end portion of the outer circumference side rotor iron core 32 and which has a fitting hole 38a in which the rotation axis O is fitted.

In the inner circumference side rotating part 21, the inner circumference side end face portion 36a of the inner circumference side axis member 36 abuts one axis direction end portion of the inner circumference side rotor iron core 31 so as to cover the respective opening ends of the magnet fitting holes 33a of the inner circumference side rotating part 21.

The inner circumference side axis portion 36b of the inner circumference side axis member 36 has an outer diameter slightly larger than an inner diameter of the inner circumference portion of the inner circumference side rotor iron core 31. It is pressed into the inner circumference portion of the inner circumference side rotor iron core 31, and is fixed in a state of being closely fit.

The inner circumference side axis member 36 has an inner circumferential face with an inner diameter slightly larger than the outer diameter of the rotation axis O. Between the inner circumferential face of the inner circumference side axis member 36 and an outer circumferential face of the rotation axis O, there are provided bearing members 39. The inner circumference side rotating part 21 is rotatable independently of the rotation axis O.

Inside the inner circumference side axis member 36, there are provided a plurality of oil channels 40 each includes: a first end portion 40a which opens on a surface of the inner circumference side axis end portion 36c connected to the phase control apparatus 25, and to which a hydraulic pressure is supplied; and a second end portion 40b which opens on the outer circumferential face 36A of the inner circumference side end face portion 36a.

In each of the second end portions 40b of the oil channels 40, there is contained a movable pin 41 which is capable of protruding from the second end portion 40b to the outside by means of a pressure of oil supplied from the phase control apparatus 25 to the respective oil channels 40. Between a base end of the movable pin 41 and an inside of the oil channel 40, there is provided a spring 42 which imparts a reactive force against a pressure of oil acting on the movable pin 41.

The springs 42 are set to have a relaxed length when respective tips of the movable pins 41 are contained inside the respective oil channel 40.

In the outer circumference side rotating part 22, the outer circumference side end face member 37 abuts one axis direction end portion of the outer circumference side rotor iron core 32 so as to cover the respective opening ends of the magnet fitting holes 34a of the outer circumference side rotating part 22.

The outer circumference side end face member 37 has an inner circumferential face 37A with an inner diameter slightly larger than an outer diameter of the outer circumferential face 36A of the inner circumference side end face portion 36a of the inner circumference side axis member 36. In the inner circumferential face 37A, there are formed a plurality of container holes 43 respectively capable of containing a tip portion of the respective movable pins 41 which protrude from the outer circumferential face 36A of the inner circumference side end face portion 36a. To each of the container holes 43, there is connected a through-hole 44 which extends through the outer circumference side end face member 37 and opens on the surface (outer circumferential face) of the outer circumference side end face member 37.

The plurality of container holes 43 are arranged so that when the tips of the appropriate movable pins 41 are sequentially contained in the respective container holes 43, a field state between the inner circumference side rotating part 21 and the outer circumference side rotating part 22 makes a stepwise transition among a plurality of different field states which are set to range from the field strengthening state in which the unlike-poles of the inner circumference side permanent magnets 21a of the inner circumference side rotating part 21 and the outer circumference side permanent magnets 22a of the outer circumference side rotating part 22 are opposingly arranged along the radial direction (that is, the inner circumference side permanent magnets 21a and the outer circumference side permanent magnets 22a are arranged in a homopolar manner) to the field weakening state in which the like-poles of the inner circumference side permanent magnets 21a of the inner circumference side rotating part 21 and the outer circumference side permanent magnets 22a of the outer circumference side rotating part 22 are opposingly arranged along the radial direction (that is, the inner circumference side permanent magnets 21a and the outer circumference side permanent magnets 22a are arranged in an antipolar manner).

The outer circumference side axis member 38 abuts the other axis direction end portion of the outer circumference side rotor iron core 32 so as to cover the respective opening ends of the magnet fitting holes 34a of the outer circumference side rotating part 22. The rotation axis O has an outer diameter slightly larger than an inner diameter of the fitting hole 38a of the outer circumference side axis member 38. It is pressed into the fitting hole 38a, and is fixed in a state of being closely fit.

The outer circumference side end face member 37 and the outer circumference side axis member 38, which are arranged so as to sandwich the outer circumference side permanent magnets 22a fitted into the respective magnet fitting holes 34a of the outer circumference side rotating part 22 from both sides in the axis direction for preventing the outer circumference side permanent magnets 22a from being displaced along the axis direction, are fixed onto the outer circumference side rotor iron core 32 by means of outer circumference side fastening members 45 such as rivets or bolts.

Consequently, when the respective springs 42 are at their relaxed lengths as a result of a hydraulic pressure not supplied from the phase control apparatus 25, and hence the respective tips of the movable pins 41 are not protruded to the outside from the respective second end portions 40b of the respective oil channels 40, the inner circumference side rotating part 21 becomes rotatable independently of the rotation axis O and the outer circumference side rotating part 22. Therefore, with the absence of an acting external force, in response to attraction forces and repulsion forces generated between the inner circumference side permanent magnets 21a and the outer circumference side permanent magnets 22a, the field state becomes the field strengthening state in which the unlike-poles of the inner circumference side permanent magnets 21a of the inner circumference side rotating part 21 and the outer circumference side permanent magnets 22a of the outer circumference side rotating part 22 are opposingly arranged along the radial direction (that is, the inner circumference side permanent magnets 21a and the outer circumference side permanent magnets 22a are arranged to have the same polarity direction). In the rotation of the electric motor 11, the inner circumference side rotating part 21 rotates by following the rotation of the outer circumference side rotating part 22 while maintaining the field strengthening state.

On the other hand, when the respective tips of the movable pins 41 are protruded from the outer circumferential face 36A of the inner circumference side end face portion 36a as a result of a hydraulic pressure supplied from the phase control apparatus 25 to the respective oil channels 40, and the respective tips of the movable pins 41 face the appropriate opening portions of the container holes 43 provided in the outer circumference side end face member 37, each of the respective tips of the movable pins 41 is contained in an appropriate container hole 43.

When the respective tips of the movable pins 41 do not face the appropriate opening portions of the container holes 43 provided in the outer circumference side end face member 37, the respective tips of the movable pins 41 abut the inner circumferential face 37A of the outer circumference side end face member 37. As a result, in the rotation of the electric motor 11, the rotation of the inner circumference side rotating part 21 which follows the rotation of the outer circumference side rotating part 22 in response to attraction forces and repulsion forces generated between the inner circumference side permanent magnets 21a and the outer circumference side permanent magnets 22a is suppressed by the friction between the respective movable pins 41 and the outer circumference side end face member 37. Then, the relative phase between the inner circumference side rotating part 21 and the outer circumference side rotating part 22 is changed until the respective tips of the movable pins 41 face the appropriate opening portions of the container holes 43 of the outer circumference side end face member 37, when the respective tips of the movable pins 41 are contained in the appropriate container holes 43.

When the respective tips of the movable pins 41 are contained in the appropriate container holes 43, a state of the electric motor 11 is fixed to a predetermined field state ranging from the field strengthening state to the field weakening state, in accordance with the positions of these container holes 43.

When the respective tips of the movable pins 41 are protruded from the outer circumferential face 36A of the inner circumference side end face portion 36a as a result of a hydraulic pressure supplied from the phase control apparatus 25 to the respective oil channels 40, the springs 42 are in an extended state, which generates reactive forces to resist the pressure of the oil which presses the respective movable pins 41 in the radially outward direction. As a result, in the rotation of the electric motor 11, when the supply of the hydraulic pressure from the phase control apparatus 25 to the respective oil channels 40 is stopped, the respective movable pins 41 are displaced in the radially inward direction due to elastic forces of the springs 42. Accordingly, when the respective tips of the movable pins 41 are withdrawn from the container holes 43, the inner circumference side rotating part 21 becomes rotatable independently of the rotation axis O and the outer circumference side rotating part 22, and rotates so as to follow the rotation of the outer circumference side rotating part 22 while maintaining the field strengthening state.

In the phase control apparatus 25, there is provided an oil pump (not shown in the figure) or the like which is connected to the inner circumference side axis member 36 of the inner circumference side rotating part 21 for supplying a hydraulic pressure to the plurality of oil channels 40 through control by a control portion 16.

The control portion 16 is one for performing a feedback control over a current on dq coordinates which form rotational rectangular coordinates. The control portion 16 computes, based on a torque command Tq which is set in accordance with accelerator openings or the like affected by an acceleration operation by a driver, a d-axis current command Idc and a q-axis current command Iqc to calculate respective phase output voltages Vu, Vv, and Vw based on the d-axis current command Idc and the q-axis current command Iqc. The control portion 16 then inputs a PWM signal, which is a gate signal, to the PDU 17 in accordance with the respective phase output voltages Vu, Vv, and Vw, and also performs control such that respective deviations of a d-axis current Id and a q-axis current Iq, which are obtained by transforming any two phase currents of the respective phase currents Iu, Iv, and Iw actually supplied from the PDU 17 to the electric motor 11 into currents on the dq coordinates, from the d-axis current command Idc and the q-axis current command Iqc become zero.

The control portion 16 is made of: a target current setting portion 51; a current deviation calculation portion 52; a field control portion 53; a power control portion 54; a current control portion 55; a dq to three-phase transformation portion 56; a PWM signal generation portion 57; a filter processing portion 58; a three-phase to dq transformation portion 59; a rotation rate calculation portion 60; a field weakening phase command output portion 61; and a hydraulic pressure control portion 62.

To the control portion 16 are input: detection signals Ius and Iws which are output from current sensors 71 for respectively detecting the U-phase current Iu and the W-phase current Iw from the three-phase currents Iu, Iv, and Iw output from the PDU 17 to the electric motor 11; a detection signal which is output from a voltage sensor 72 for detecting a terminal voltage (source voltage) VB of the battery 18; a detection signal which is output from a rotation sensor 73 for detecting a rotation angle θM (that is, a rotation angle of a magnetic pole of the rotor from a predetermined reference rotation position) of the rotor of the electric motor 11; and a torque command Tq, a gear ratio command which is a control command for a gear ratio of the transmission T/M, and a drive wheel selection command which is a control command for a drive state of the vehicle 10 (for example, front-wheel drive state, all-wheel drive state, and the like), these commands being output from an external control apparatus (not shown in the figure).

The target current setting portion 51 computes current commands for specifying the respective phase currents Iu, Iv, and Iw supplied from the PDU 17 to the electric motor 11, based on a torque command Tq (for example, a command value for causing the electric motor 11 to generate a torque required in accordance with an amount of accelerator pedal depression by a driver) which is input from, for example, an external control apparatus (not shown in the figure), on the rotation rate NM of the electric motor 11 which is input from the rotation rate calculation portion 60, and on an induced voltage constant Ke. These current commands are output to the current deviation calculation portion 52 as a d-axis target current Idc (current command) and a q-axis target current (current command) Iqc on rotating rectangular coordinates.

The dq coordinates which make up these rotating rectangular coordinates take a flux direction of field poles by the permanent magnets of the rotor as a d axis (field axis), and a direction orthogonal to the d axis as a q axis (torque axis). They rotate synchronously with the rotational phases of the rotor 23 of the electric motor 11. As a result, the d-axis target current Idc and the q-axis target current Iqc, which are direct-current-like signals, are provided as current commands for alternating current signals supplied from the PDU 17 to the respective phases of the electric motor 11.

The current deviation calculation portion 52 is made of: a d-axis current deviation calculation portion 52a for calculating a deviation ΔId between a d-axis target current Idc to which is added a d-axis correction current input from the field control portion 53 and a d-axis current Id; and a q-axis current deviation calculation portion 52a for calculating a deviation ΔIq between a q-axis target current Iqc to which is added a q-axis correction current input from the power control portion 54 and a q-axis current Iq.

To suppress an increase in counter electromotive voltage involved in an increase in the rotation rate NM of the electric motor 11, the field control portion 53 outputs a target value of a field weakening control, which controls current phases so as to equivalently reduce a field amount of the rotor 23, with respect to a field weakening current as a d-axis correction current.

The power control portion 54 outputs a q-axis correction current for correcting the q-axis target current Iqc in accordance with an appropriate power control according to the remaining capacity of the battery 18 or the like.

The current control portion 55 controls and amplifies the deviation ΔId through a PI (proportional integral) operation in accordance with the electric motor rotation rate NM to calculate a d-axis voltage command value Vd, and controls and amplifies the deviation ΔIq to calculate a q-axis voltage command value Vq.

The dq to three-phase transformation portion 56 uses a rotation angle θM of the rotor input from the rotation rate calculation portion 60 to transform the d-axis voltage command value Vd and the q-axis voltage command value Vq on the dq coordinates into a U-phase output voltage Vu, a V-phase output voltage Uu, and a W-phase output voltage Wu on the three-phase alternating current coordinates, which are static coordinates.

The PWM signal generation portion 57 generates a gate signal (that is, a PWM signal), which is a switching command made of pulses for on/off driving the respective switching elements of the PMW inverter of the PDU 17 by means of a pulse width modulation based on respective sine-wave-like phase output voltages Vu, Vv, and Vw, on a carrier signal made of a triangular wave, and on a switching frequency.

The filter processing portion 58 performs filter processing, such as removing high-frequency components, on the detection signals Ius and Iws for the respective phase currents detected by the respective current sensors 71, to thereby extract the respective phase currents Iu and Iw as physical quantities.

The three-phase to dq transformation portion 59 calculates a d-axis current Id and a q-axis current Iq on the rotational coordinates based on the rotational phases of the electric motor 11, that is, the dq coordinates, from the respective phase currents Iu and Iw extracted by the filter processing portion 58 and on the rotation angle θM of the rotor 23 which is input from the rotation rate calculation portion 60.

The rotation rate calculation portion 60 extracts the rotation angle θM of the rotor of the electric motor 11 from the detection signal which is output from the rotation sensor 73, and also calculates the rotation rate NM of the electric motor 11 based on the rotation angle θM.

Based on, for example, the torque command Tq, the rotation rate NM of the electric motor 11, the gear ratio command, and the drive wheel selection command, the field weakening phase command output portion 61 outputs a command value (a field weakening phase command) for a relative phase θ between the inner circumference side rotating part 21 and the outer circumference side rotating part 22 in a field weakening state where a linkage flux amount with which a field flux by the outer circumference side permanent magnets 22a of the outer circumference side rotating part 22 crosses the stationary part windings 24a is reduced by a field flux of the inner circumference side permanent magnets 21a of the inner circumference side rotating part 21 (for example, a relative phase θ of the field strengthening state in which the unlike-poles of the inner circumference side permanent magnets 21a of the inner circumference side rotating part 21 and the outer circumference side permanent magnets 22a of the outer circumference side rotating part 22 are opposingly arranged, that is, the inner circumference side permanent magnets 21a and the outer circumference side permanent magnets 22a are arranged in a homopolar manner, is defined to be zero).

The hydraulic pressure control portion 62 selects any one of the plurality of oil channels 40 inside the inner circumference side axis member 36 in accordance with the field weakening phase command which is output from the field weakening phase command output portion 61, and outputs a hydraulic pressure command for giving a direction to supply a hydraulic pressure from the phase control apparatus 25 to the selected oil channel 40.

The electric-motor-equipped vehicle 10 according to the present embodiment is provided with the above configuration. Next is a description of an operation of the vehicle 10, more particularly, an operation of the field weakening phase command output portion 61, with reference to the appended drawings.

Figure 5:
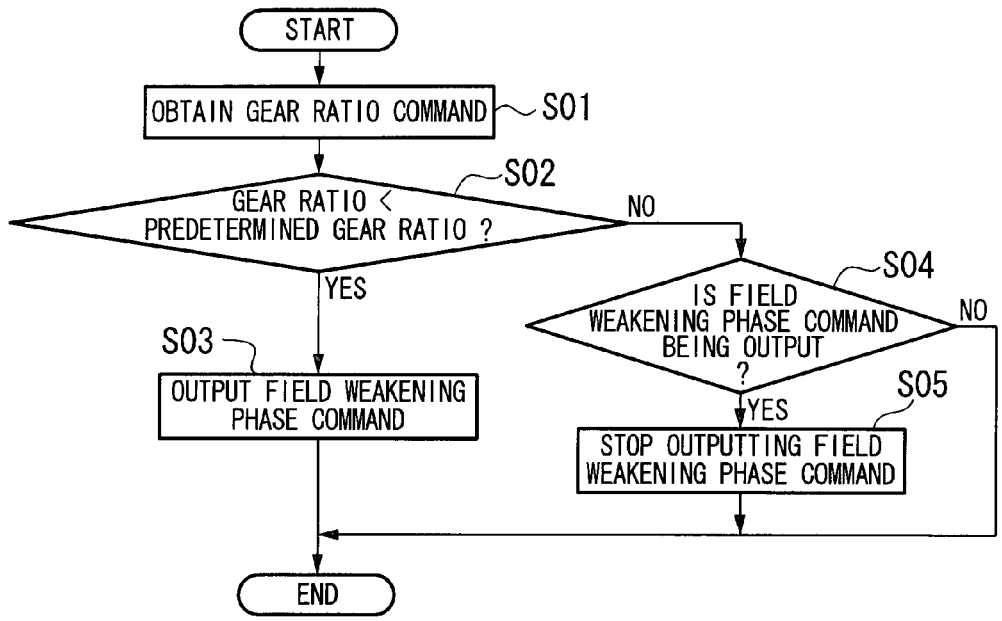
FIG. 5 is a flow chart showing an operation of a field weakening phase command output portion according to the same embodiment.

First, in Step S01 shown in FIG. 5, a gear ratio command which is output from an external control apparatus or the like is obtained.

Next, in Step S02, it is determined whether or not the gear ratio according to the obtained gear ratio command is less than a predetermined gear ratio #R.

If the determination result is "NO," that is, if the gear ratio is in low-gear, the procedure is moved to Step S04, which will be described later.

On the other hand, if the determination result is "YES," that is, if the gear ratio is in high-gear, the procedure is moved to Step S03.

In Step S03, a field weakening phase command in accordance with the gear ratio is output by referring to, for example, a map or the like showing a correspondence of the relative phase θ between the inner circumference side rotating part 21 and the outer circumference side rotating part 22, with the gear ratio in the field weakening state, and a series of the processing steps is brought to an end.

Figure 6A:
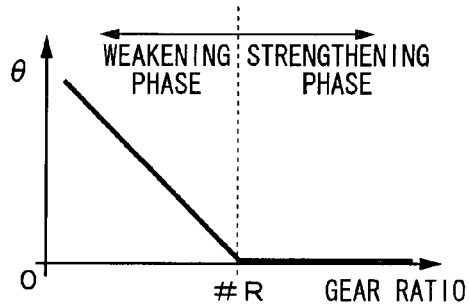
FIG. 6A is a graph showing a given correspondence in a field weakening state between a relative phase θ between an inner circumference side rotating part and an outer circumference side rotating part, and a gear ratio.
Figure 6B:
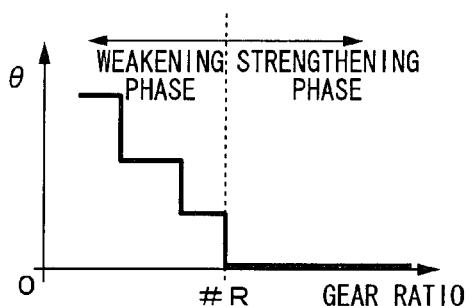
FIG. 6B is a graph showing a given correspondence in a field weakening state between a relative phase θ between an inner circumference side rotating part and an outer circumference side rotating part, and a gear ratio.

When the transmission T/M is a steplessly variable transmission, a predetermined correspondence between the phase θ and the gear ratio is set so that if the gear ratio is greater than or equal to the predetermined gear ratio #R, the phase θ is zero, and that the phase θ increases as the gear ratio decreases from the predetermined gear ratio #R, as shown in FIG. 6A. When the transmission T/M is a stepping transmission, a predetermined correspondence between the phase θ and the gear ratio is set so that if the gear ratio is greater than or equal to the predetermined gear ratio #R, the phase θ is zero, and that the phase θ increases in stepwise with appropriate increments, as the gear ratio decreases from the predetermined gear ratio #R, as shown in FIG. 6B.

In Step S04, it is determined whether or not the field weakening phase command is being output.

If the determination result is "NO," a series of the processing steps is brought to an end.

On the other hand, if the determination result is "YES," the procedure is moved to Step S05.

In Step S05, the output of the field weakening phase command is stopped, and a series of the processing steps is brought to an end.

That is, if the gear ratio is less than the predetermined gear ratio #R and is in high-gear, the driving efficiency of the internal combustion engine 12 is relatively increased. Therefore, the driving force of the internal combustion engine 12 is preferentially used to run the vehicle 10. At the time, the electric motor 11 is set to the field weakening state, to thereby make it possible to suppress the generation of a braking action on the vehicle 10 due to the counter electromotive voltage of the electric motor 11.

Figure 7:
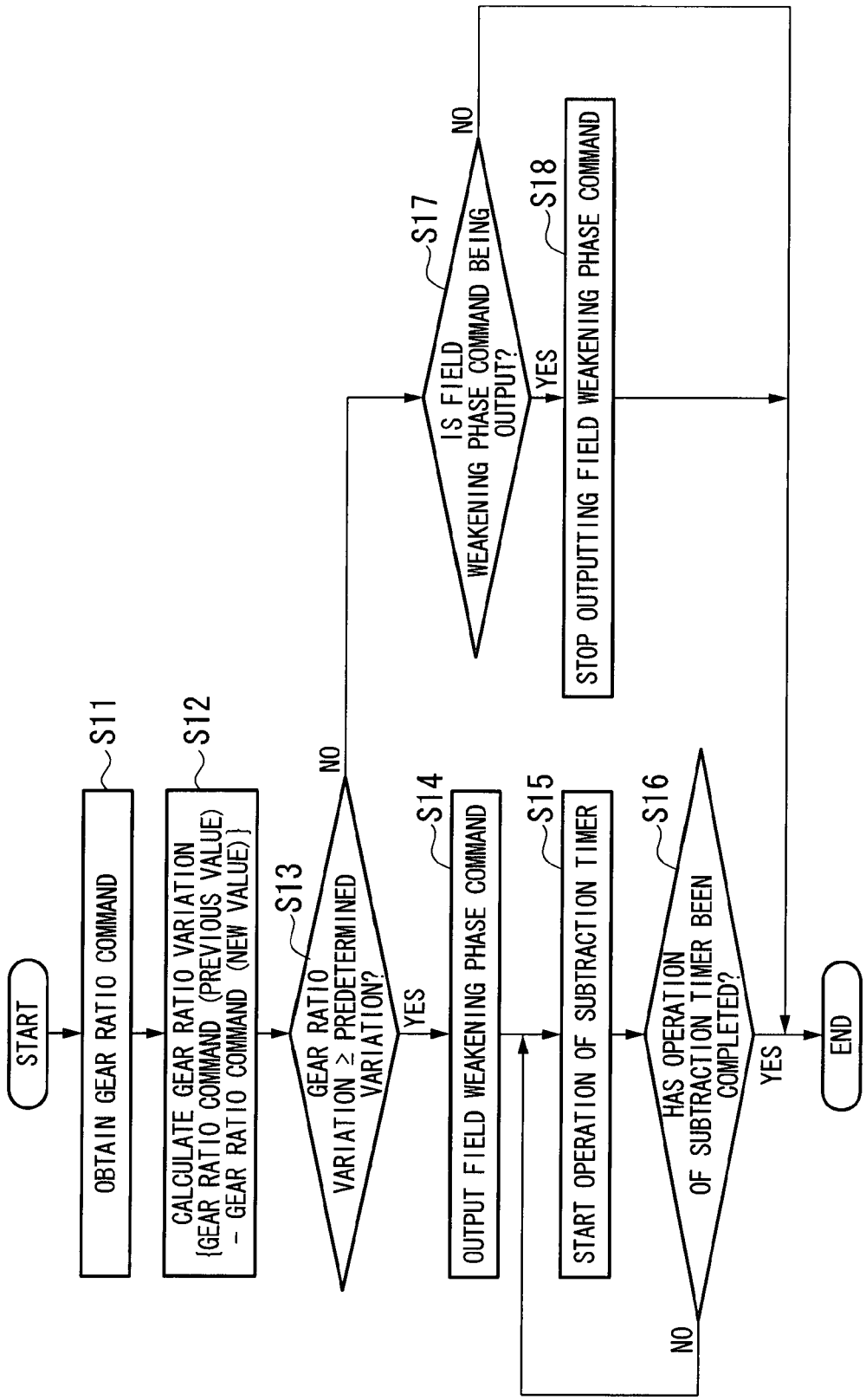
FIG. 7 is a flow chart showing an operation of a field weakening phase command output portion according to the same embodiment.

In Step S11 shown in FIG. 7, a gear ratio command which is output from an external control apparatus or the like is obtained.

Next, in Step S12, the obtained new value of the gear ratio command is subtracted from the previous value of the gear ratio command, which has been obtained in the previous processing, to calculate a gear ratio variation.

In Step S13, it is determined whether or not the calculated gear ratio variation is more than a predetermined variation.

If the determination result is "NO," the procedure is moved to Step S17, which will be described later.

On the other hand, if the determination result is "YES," that is, if the gear ratio is relatively changed from a small gear ratio state (high-gear) to a large gear ratio state (low-gear), the procedure is moved to Step S14.

In Step S14, a field weakening phase command in accordance with the gear ratio variation is output with reference to a map or the like showing a correspondence between the relative phase θ between the inner circumference side rotating part 21 and the outer circumference side rotating part 22, and the gear ratio variation in the field weakening state.

In Step S15, an operation of a predetermined subtraction timer is started.

In Step S16, it is determined whether or not the operation of the subtraction timer has been completed.

If the determination result is "YES," a series of the processing steps is brought to an end.

On the other hand, if the determination result is "NO," the procedure is moved back to the above Step S15.

In Step S17, it is determined whether or not the field weakening phase command is being output.

If the determination result is "NO," a series of the processing steps is brought to an end.

On the other hand, if the determination result is "YES," the procedure is moved to Step S18.

In Step S18, the output of the field weakening phase command is stopped, and a series of the processing steps is brought to an end.

That is, if the gear ratio variation is greater than or equal to a predetermined variation, in other words, if the state of the transmission T/M is relatively changed from a small gear ratio state (high-gear) to a relatively large gear ratio state (low-gear), the electric motor 11 is set to the field weakening state, to thereby make it possible to suppress the generation of an overcharge and an inrush current to the electrical equipment such as the PDU 17 due to a regenerative operation by the electric motor 11.

Furthermore, the output of the field weakening phase command is stopped after completion of the operation of the subtraction timer. Therefore, in a condition with the running status of the vehicle 10 being relatively stable after the change of the gear ratio, it is possible to shift the field state between the inner circumference side rotating part 21 and the outer circumference side rotating part 22 from the field weakening state to the field strengthening state.

As described above, according to the electric-motor-equipped vehicle 10 of the present embodiment, for the electric motor 11 which drives the vehicle 10 or assists the driving of the vehicle 10 by the internal combustion engine 12, the relative position between the inner circumference side permanent magnets 21a of the inner circumference side rotating part 21 and the outer circumference side permanent magnets 22a of the outer circumference side rotating part 22 can be modified with superior efficiency.

As a result, the linkage flux amount with which a field flux by the outer circumference side permanent magnets 22a crosses the stationary part windings 24a can be actively increased or decreased with superior efficiency by means of a field flux by the inner circumference side permanent magnets 21a.

In the field strengthening state, a torque constant (that is, torque/phase current) of the electric motor 11 can be set to a relatively high value. Therefore, without decreasing the current loss in operation of the electric motor 11, or without modifying a maximum value of an output current of the PDU 17 which controls an application of a current to the stationary part windings 24a, a maximum torque value which is output by the electric motor 11 can be increased, and a maximum value of a driving efficiency of the electric motor 11 can be increased to expand a high-efficiency region where the driving efficiency is greater than or equal to a predetermined efficiency.

In addition, a state change between the field strengthening state and the field weakening state which is developed by the field flux of the inner circumference side permanent magnets 21a with respect to the field flux of the outer circumference side permanent magnets 22a can be set steplessly, and hence an induced voltage constant Ke of the electric motor 11 can be steplessly changed to an appropriate value. As a result, the operable rotation rate and an value of operable torque of the electric motor 11 can be steplessly modified, and the ranges of the operable rotation rate and the operable torque can be expanded.

Moreover, when the gear ratio is less than the predetermined gear ratio #R and is in high-gear, the electric motor 11 is set to the field weakening state, to thereby make it possible to suppress the generation of a braking operation on the vehicle 10 due to a counter electromotive voltage of the electric motor 11 when the vehicle 10 is run by preferential use of the driving force of the internal combustion engine 12 whose driving efficiency is relatively increased.

Furthermore, if the gear ratio variation is greater than or equal to a predetermined variation, in other words, if the state of the transmission T/M is relatively changed from a small gear ratio state (high-gear) to a large gear ratio state (low-gear), the electric motor 11 is set to the field weakening state, to thereby make it possible to suppress the generation of an overcharge and an inrush current to the electrical equipment such as the PDU 17 due to a regenerative operation by the electric motor 11.

In addition, while preventing the electric motor 11 from becoming complex in configuration, it is possible to easily change the induced voltage constant of the electric motor 11 from the field strengthening state to the field weakening state by means of the respective movable pins 41 controlled by a hydraulic pressure.

In the aforementioned embodiment, a plurality of oil channels 40 are provided inside the inner circumference side axis member 36, and a plurality of container holes 43 are provided in the outer circumference side end face member 37. However, the invention is not limited to this. For example, only one container hole 43 may be provided for a plurality of oil channels 40. Alternately, for example, only one oil channel 40 and only one container hole 43 may be provided.

Figure 8:
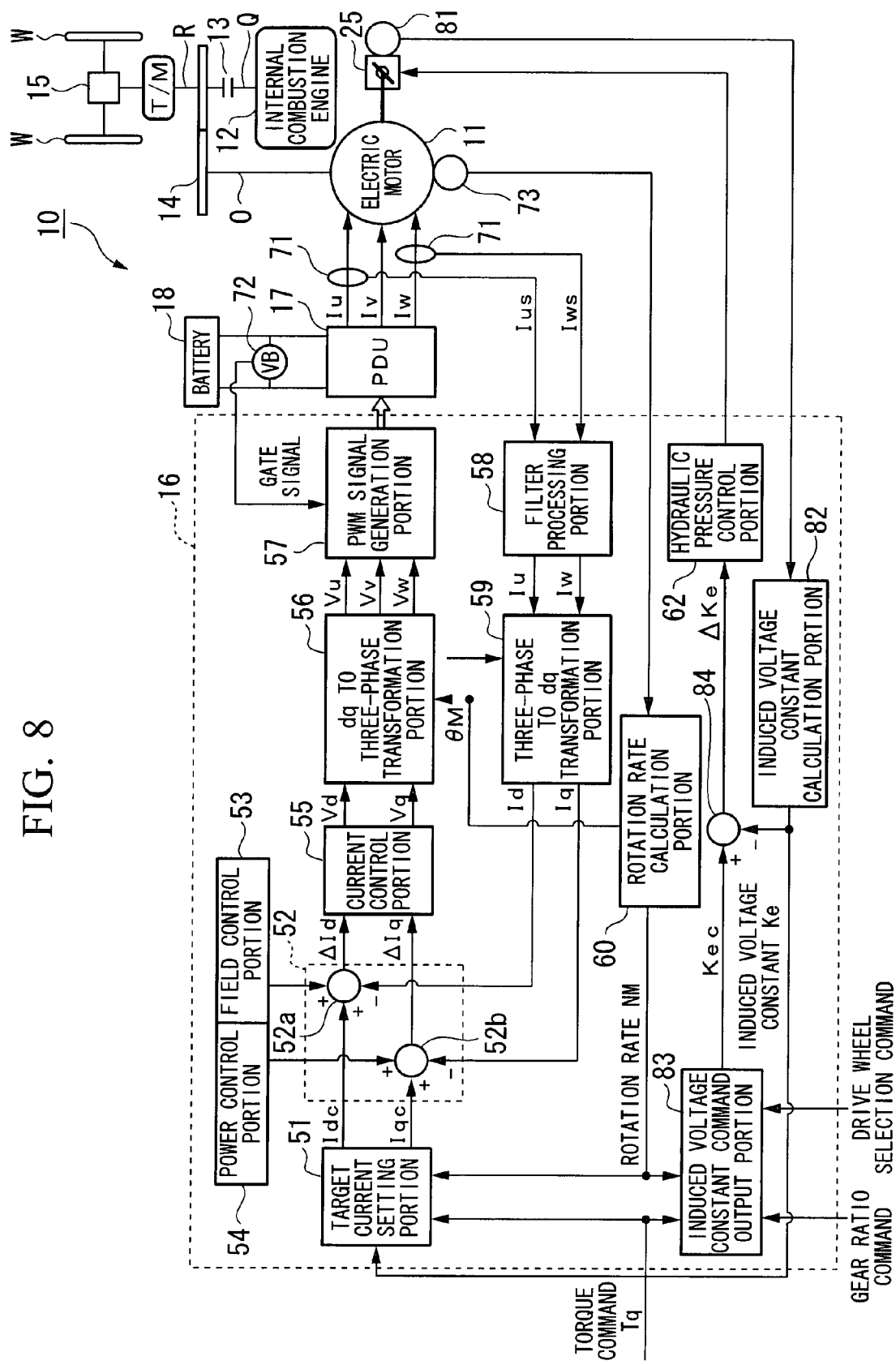
FIG. 8 is a block diagram of an electric-motor-equipped vehicle according to a first modification of the same embodiment.

In the aforementioned embodiment, the field weakening phase command output portion 61 may be omitted, and a hydraulic pressure sensor 81, an induced voltage constant calculation portion 82, an induced voltage constant command output portion 83, and an induced voltage constant difference calculation portion 84 may be newly added to configure the control portion 16, as is the case with, for example, a first modification shown in FIG. 8.

In the first modification, the hydraulic pressure sensor 81 outputs a detection signal of a hydraulic pressure supplied from the phase control apparatus 25 to the respective oil channels 40.

Based on the detection signal of the hydraulic pressure which is output from the hydraulic pressure sensor 81, the induced voltage constant calculation portion 82 calculates an induced voltage constant Ke in accordance with the relative phase θ between the inner circumference side rotating part 21 and the outer circumference side rotating part 22, and inputs the induced voltage constant Ke to the target current setting portion 51.

Based on the torque command Tq, on the rotation rate NM of the electric motor 11, on the gear ratio command, and on the drive wheel selection command, the induced voltage constant command output portion 83 outputs a command value (induced voltage constant command) Kec for the induced voltage constant Ke of the electric motor 11 in the field weakening state.

The induced voltage constant difference calculation portion 84 outputs an induced voltage constant difference ΔKe, which is obtained by subtracting the induced voltage constant Ke output from the induced voltage constant calculation portion 82, from the induced voltage constant command Kec output from the induced voltage constant command output portion 83.

The hydraulic pressure control portion 62 selects any one of the plurality of oil channels 40 inside the inner circumference side axis member 36 in accordance with the induced voltage constant difference ΔKe which is input from the induced voltage constant difference calculation portion 84, and outputs a hydraulic pressure command for giving a direction to supply a hydraulic pressure from the phase control apparatus 25 to the selected oil channel 40.

The electric-motor-equipped vehicle 10 according to the first modification is provided with the above configuration. Next is a description of an operation of the vehicle 10, more particularly, an operation of the induced voltage constant command output portion 83, with reference to the appended drawings.

Figure 9:
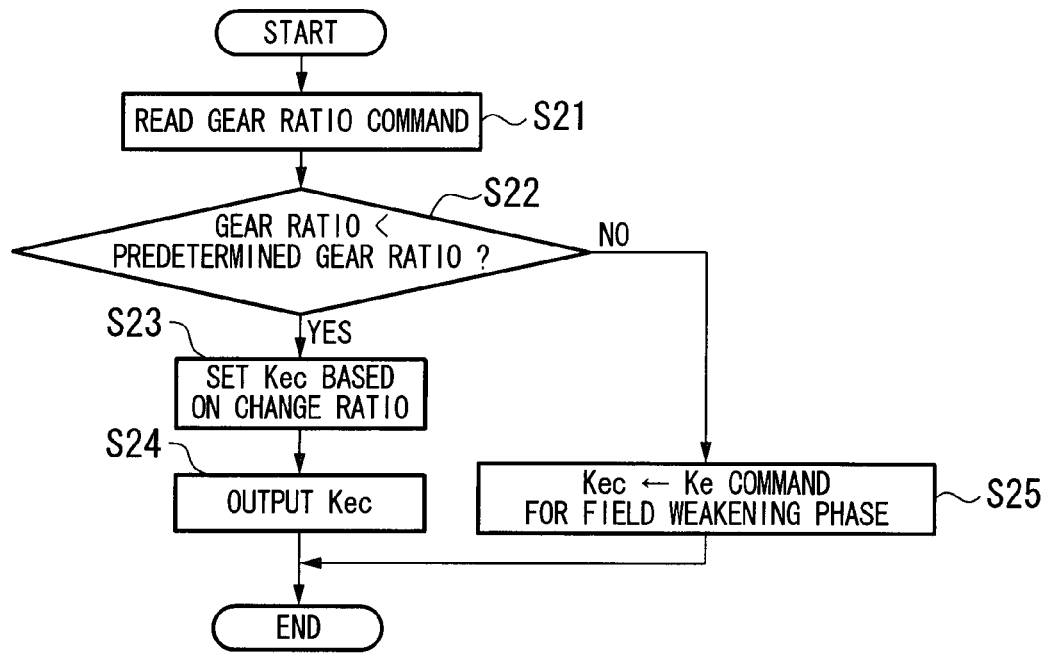
FIG. 9 is a flow chart showing an operation of an induced voltage constant command output portion according to the first modification of the same embodiment.

First, for example in Step S21 shown in FIG. 9, a gear ratio command which is output from an external control apparatus or the like is obtained.

Next, in Step S22, it is determined whether or not the gear ratio according to the obtained gear ratio command is less than a predetermined gear ratio #R.

If the determination result is "NO," that is, if the gear ratio is in low-gear, the procedure is moved to Step S25, which will be described later.

On the other hand, if the determination result is "YES," that is, if the gear ratio is in high-gear, the procedure is moved to Step S23.

In Step S23, an induced voltage constant command Kec in accordance with a gear ratio is set with reference to a map or the like showing a correspondence between the command value (induced voltage constant command) Kec for the induced voltage constant Ke and the gear ratio of the electric motor 11 in the field weakening state.

Figure 10A:
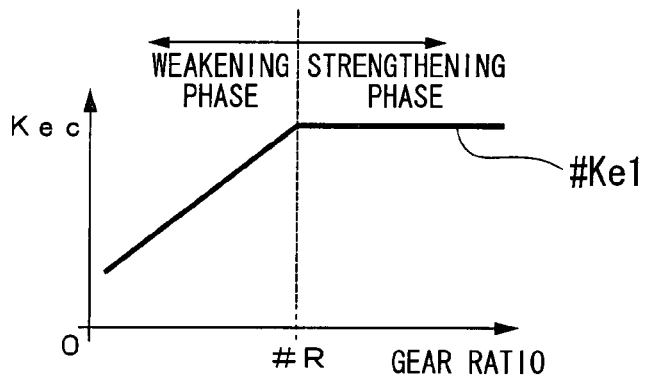
FIG. 10A is a graph showing a given correspondence in a field weakening state between an induced voltage constant command Kec and a gear ratio.
Figure 10B:
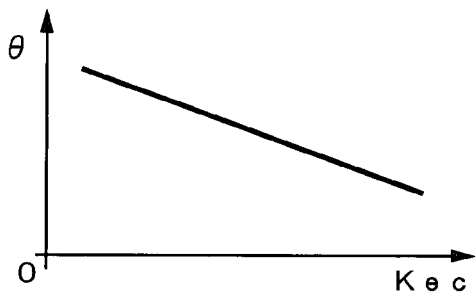
FIG. 10B is a graph showing a given correspondence in a field weakening state between a relative phase θ between an inner circumference side rotating part 21 and an outer circumference side rotating part 22, and an induced voltage constant command Kec.

A predetermined correspondence between the induced voltage constant command Kec and the gear ratio is set so that if the gear ratio is greater than or equal to the predetermined gear ratio #R, the Kec is a predetermined upper limit induced voltage constant #Ke1, and that the induced voltage constant command Kec decreases from the upper limit induced voltage constant #Ke1 as the gear ratio decreases from the predetermined gear ratio #R, as shown in, for example, FIG. 10A. The relative phase θ between the inner circumference side rotating part 21 and the outer circumference side rotating part 22, and the induced voltage constant command Kec in the field weakening state are set so that the phase θ increases as the induced voltage constant command Kec is decreased, as shown in, for example, FIG. 10B.

In Step S24, the set induced voltage constant command Kec is output, and a series of the processing steps is brought to an end.

In Step S25, a predetermined command value for the induced voltage constant Ke of the electric motor 11 in the field strengthening state (a Ke command for the field strengthening phase) is set as the induced voltage constant command Kec, and a series of the processing steps is brought to an end.

That is, if the gear ratio is less than the predetermined gear ratio #R and is in high-gear, the driving efficiency of the internal combustion engine 12 is relatively increased. Therefore, the driving force of the internal combustion engine 12 is preferentially used to run the vehicle 10. At this time, by setting the electric motor 11 to the field weakening state, it is possible to suppress the generation of a braking action on the vehicle 10 due to the counter electromotive voltage of the electric motor 11.

Figure 11:
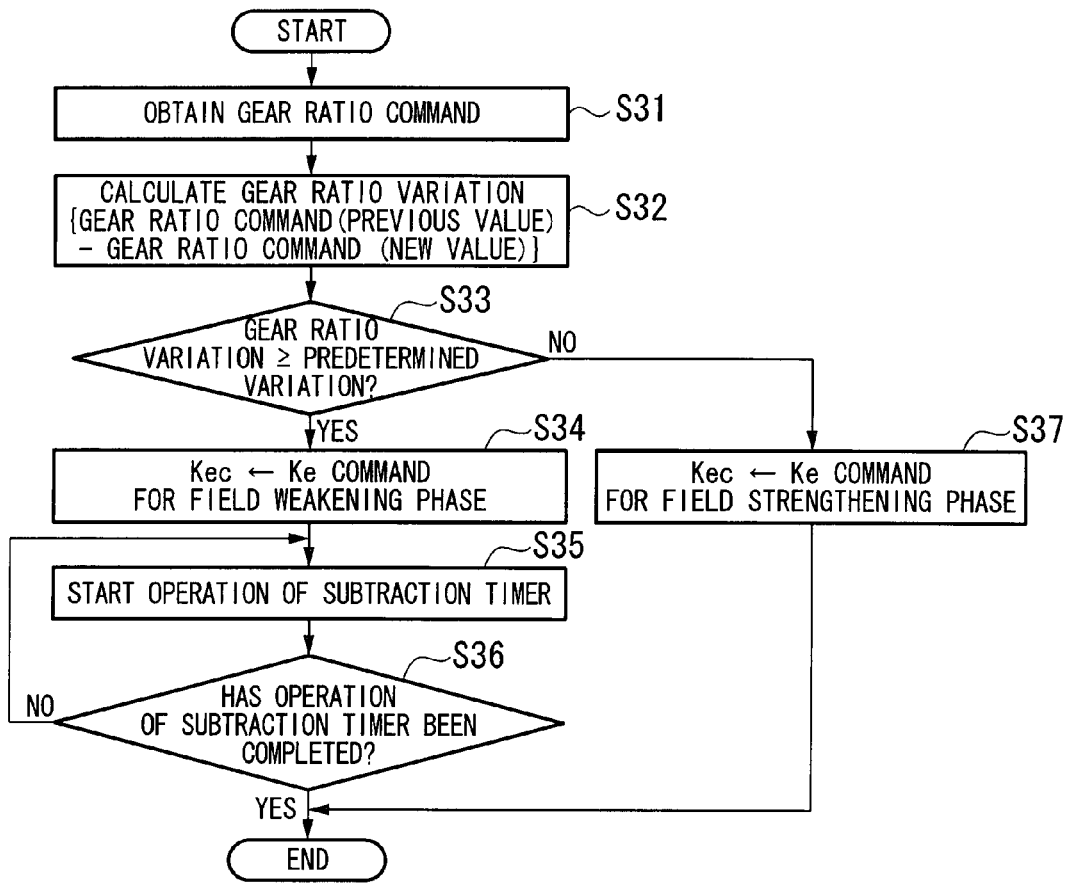
FIG. 11 is a flow chart showing an operation of an induced voltage constant command output portion according to the first modification of the same embodiment.

In Step S31 shown in FIG. 11, a gear ratio command which is output from an external control apparatus or the like is obtained.

Next, in Step S32, the obtained new value of the gear ratio command is subtracted from the previous value of the gear ratio command, which has been obtained in the previous processing, to calculate a gear ratio variation.

In Step S33, it is determined whether or not the calculated gear ratio variation is greater than or equal to a predetermined variation.

If the determination result is "NO," the procedure is moved to Step S37, which will be described later.

On the other hand, if the determination result is "YES," that is, if the gear ratio is relatively changed from a small gear ratio state (high-gear) to a large gear ratio state (low-gear), the procedure is moved to Step S34.

In Step S34, an induced voltage constant command Kec in accordance with the gear ratio variation is output with reference to, for example, a map or the like showing a correspondence between a command value (induced voltage constant command) Kec for the induced voltage constant Ke of the electric motor 11 and the gear ratio variation in the field weakening state.

In Step S35, an operation of a predetermined subtraction timer is started.

In Step S36, it is determined whether or not the operation of the subtraction timer has been completed.

If the determination result is "YES," a series of the processing steps is brought to an end.

On the other hand, if the determination result is "NO," the procedure is moved back to the above Step S35.

In Step S37, a predetermined command value for the induced voltage constant Ke of the electric motor 11 in the field strengthening state (a Ke command for the field strengthening phase) is set as the induced voltage constant command Kec, and a series of the processing steps is brought to an end.

That is, if the gear ratio variation is greater than or equal to a predetermined variation, in other words, if the state of the transmission T/M is relatively changed from a small gear ratio state (high-gear) to a large gear ratio state (low-gear), the electric motor 11 is set to the field weakening state, to thereby make it possible to suppress the generation of an overcharge and an inrush current to the electrical equipment such as the PDU 17 due to a regenerative operation by the electric motor 11.

Furthermore, the output of the field weakening phase command is stopped after completion of the operation of the subtraction timer. Therefore, in a condition with the running status of the vehicle 10 being relatively stable after the change of the gear ratio, it is possible to shift the field state between the inner circumference side rotating part 21 and the outer circumference side rotating part 22 from the field weakening state to the field strengthening state.

Figure 12:
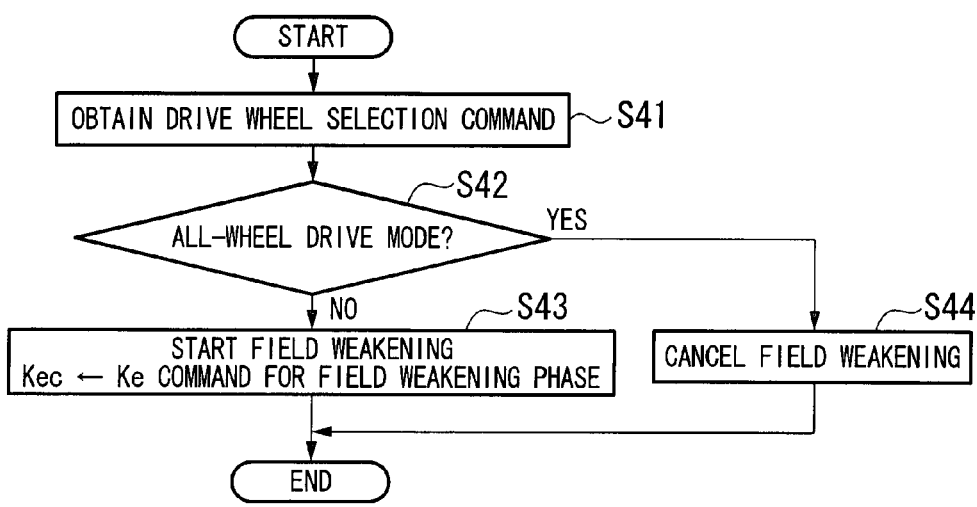
FIG. 12 is a flow chart showing an operation of an induced voltage constant command output portion according to the first modification of the same embodiment.

In Step S41 shown in FIG. 12, a drive wheel selection command which is output from an external control apparatus or the like is obtained.

Next, in Step S42, it is determined whether or not an all-wheel drive state is set in the obtained drive wheel selection command.

If the determination result is "NO," that is, if a front-wheel drive state or a rear-wheel drive state is set, the procedure is moved to Step S43. In the Step S43, a predetermined command value for the induced voltage constant Ke of the electric motor 11 in the field weakening state (a Ke command for the field weakening phase) is set as the induced voltage constant command Kec, and a series of the processing steps is brought to an end.

On the other hand, if the determination result is "YES," that is, if the all-wheel drive state is set, the procedure is moved to Step S44. In the Step S44, the setting of the Ke command for the field weakening phase for the induced voltage constant command Kec is canceled, and a series of the processing steps is brought to an end.

That is, in a drive state only with the drive wheels on the front wheel side or the rear wheel side, the electric motor 11 in a non-drive state is set to the field weakening state. Thereby, it is possible to suppress the generation of a braking operation on the vehicle 10 due to the counter electromotive voltage of the electric motor 11.

The aforementioned first modification of the embodiment may be provided with a phase control portion and a phase sensor instead of the hydraulic pressure control portion 62 and the hydraulic pressure sensor 81.

In this case, the phase control portion outputs a relative phase θ between the inner circumference side rotating part 21 and the outer circumference side rotating part 22 in the field weakening state, in accordance with, for example, the induced voltage constant difference ΔKe which is output from the induced voltage constant difference calculation portion 84. The phase control apparatus 25 then selects, in accordance with the phase θ input from the phase control portion, any one of the oil channels 40 inside the inner circumference side axis member 36, and supplies a hydraulic pressure to the selected oil channel 40. The phase sensor detects a relative phase θ between the inner circumference side rotating part 21 and the outer circumference side rotating part 22 in the field weakening state, in accordance with, for example, the oil channel 40 to which a hydraulic pressure is supplied from the phase control apparatus 25.

Figure 13:
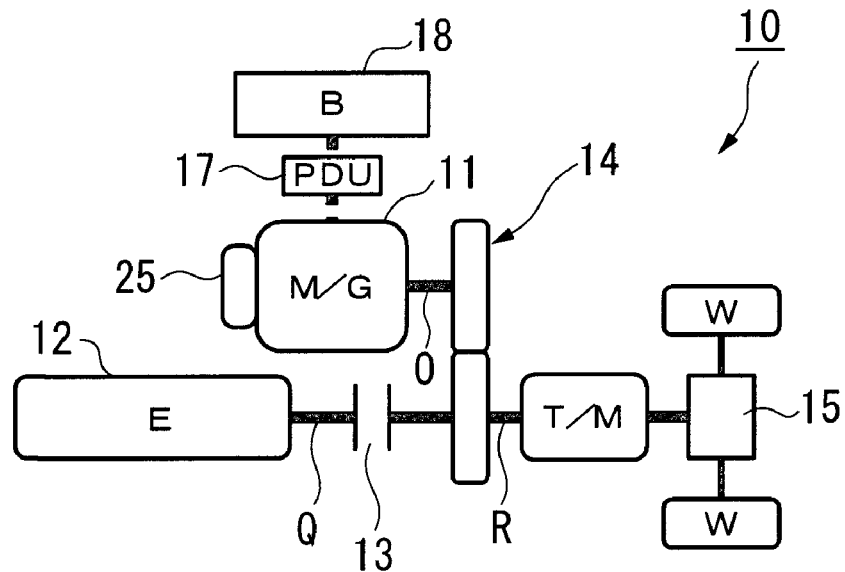
FIG. 13 is a block diagram of an electric-motor-equipped vehicle according to the same embodiment.
Figure 14:
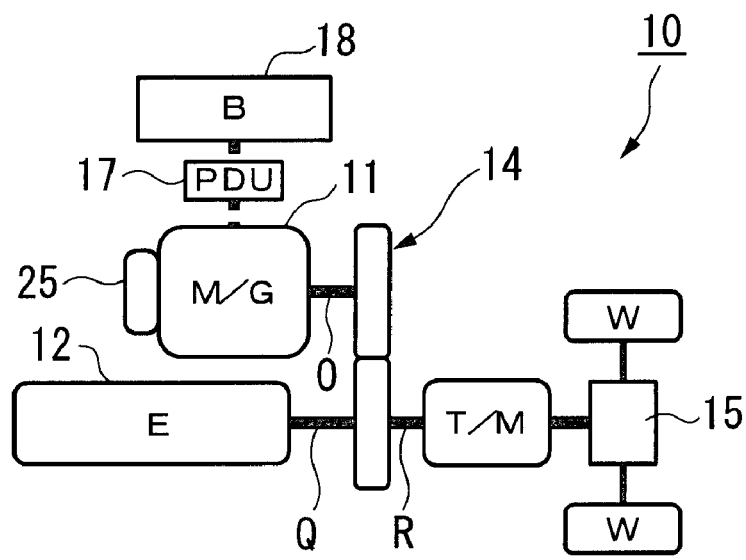
FIG. 14 is a block diagram of an electric-motor-equipped vehicle according to a second modification of the same embodiment.

In the aforementioned embodiment, the vehicle 10, a hybrid vehicle, has been described, as shown in, for example, FIG. 13, as follows: the rotation axis O of the electric motor (M/G) 11, whose drive and regenerative operations are controlled by the PDU 17 with the battery (B) 18 as its direct current source, and which is provided with the phase control apparatus 25, is connected via the motive force transmission mechanism 14 to the input axis R of the transmission T/M, which is connected to the crank axis Q of the internal combustion engine (E) 12 via the clutch 13; and the respective driving forces of the electric motor (M/G) 11 and the internal combustion engine (E) 12 are transmitted to the drive wheels W via the differential 15. However, the present invention is not limited to this. For example, as is the case with a vehicle 10 according to a second modification shown in FIG. 14, the clutch 13 may be omitted.

Figure 15:
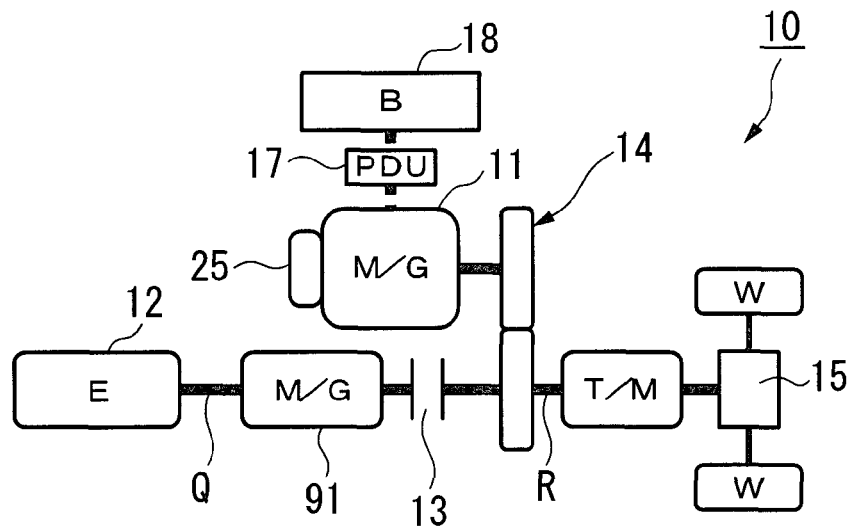
FIG. 15 is a block diagram of an electric-motor-equipped vehicle according to a third modification of the same embodiment.

Furthermore, as is the case with, for example, a vehicle 10 according to a third modification shown in FIG. 15, the electric motor (M/G) 91 with a rotation axis connected in line with the crank axis Q of the internal combustion engine (E) 12 and the clutch 13 may be provided between the internal combustion engine (E) 12 and the clutch 13, as a driving source of the vehicle 10, or as a starter electric motor and an alternator for starting the internal combustion engine (E) 12.

Figure 16:
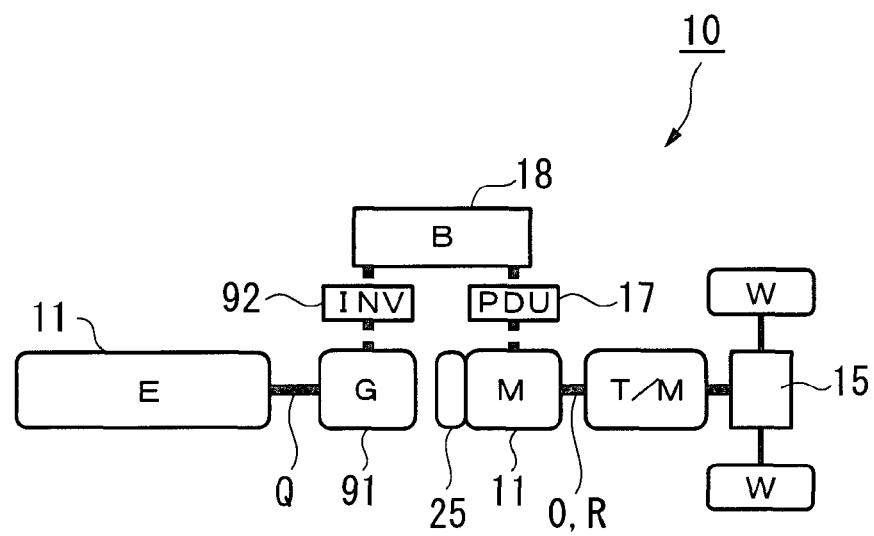
FIG. 16 is a block diagram of an electric-motor-equipped vehicle according to a fourth modification of the same embodiment.
Figure 17:
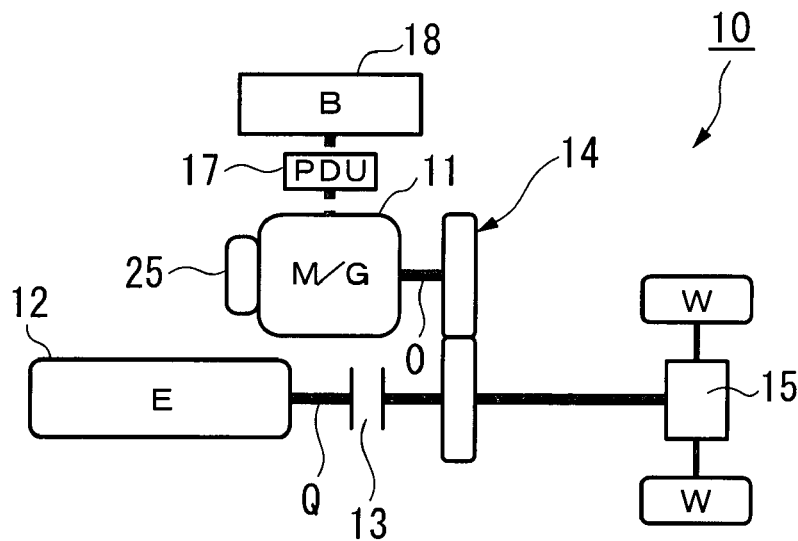
FIG. 17 is a block diagram of an electric-motor-equipped vehicle according to a fifth modification of the same embodiment.
Figure 18:
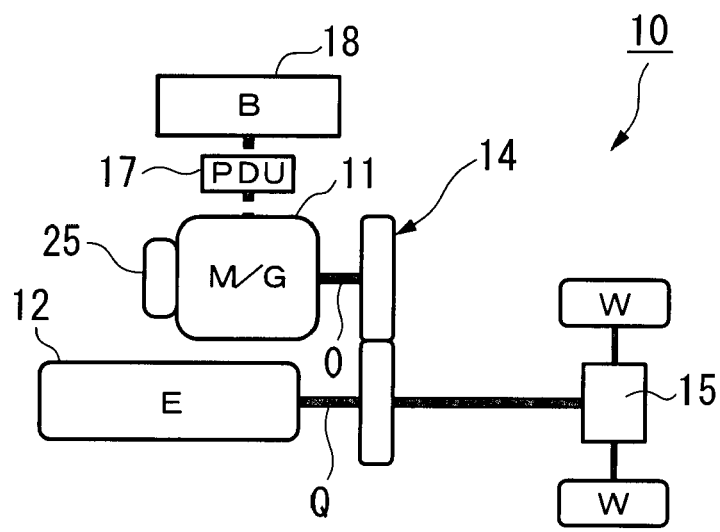
FIG. 18 is a block diagram of an electric-motor-equipped vehicle according to a sixth modification of the same embodiment.

Furthermore, in the third modification, the clutch 13 and the motive force transmission mechanism 14 may be omitted, and the rotation axis O of the electric motor (M) 11 and the input axis R of the transmission T/M may be coaxially connected, as is the case with a vehicle 10 according to, for example, a fourth modification shown in FIG. 16. In this case, an electric motor (G) 91 connected in line with the internal combustion engine (E) 12 generates electric power through drive from the internal combustion engine (E) 11. The generated energy obtained from the power generation is stored in the battery (B) 18 via an inverter 92.

In the vehicle 10 according to the aforementioned embodiment and the second to fourth modifications, the transmission T/M may be omitted as is the case with a vehicle 10 according to, for example, the fifth to eighth modifications shown in FIG. 17 to FIG. 20, respectively.

Figure 19:
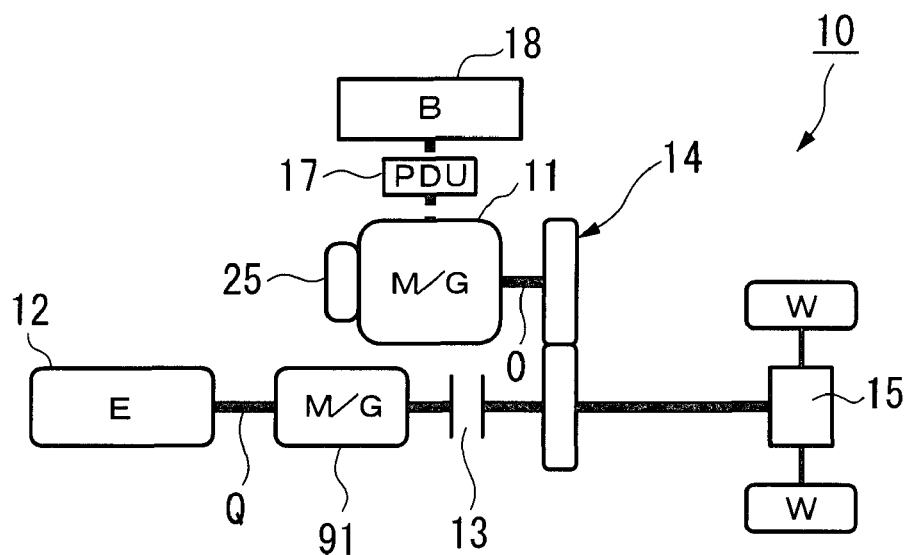
FIG. 19 is a block diagram of an electric-motor-equipped vehicle according to a seventh modification of the same embodiment.
Figure 21:
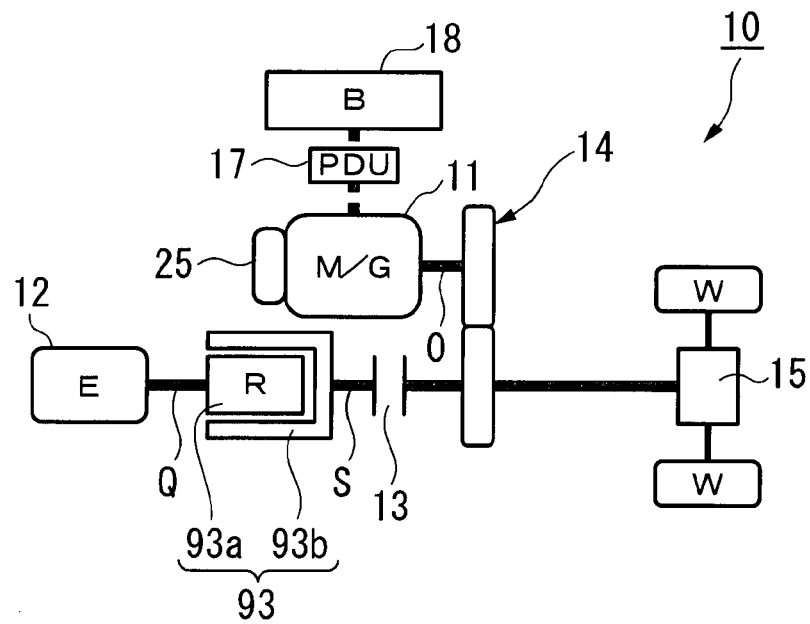
FIG. 21 is a block diagram of an electric-motor-equipped vehicle according to a ninth modification of the same embodiment.

In the vehicle 10 according to the aforementioned seventh modification shown in FIG. 19, an electric motor 93 for distributing the output of the internal combustion engine (E) 12 between the rotor (R) 93a coaxially coupled to the crank axis Q of the internal combustion engine (E) 12 and a stator 93b coupled to an output axis S which is connected to the motive force transmission mechanism 14 via the clutch 13 may be provided instead of the electric motor (G) 91, as is the case with, for example, a vehicle 10 according to a ninth modification shown in FIG. 21.

Figure 20:
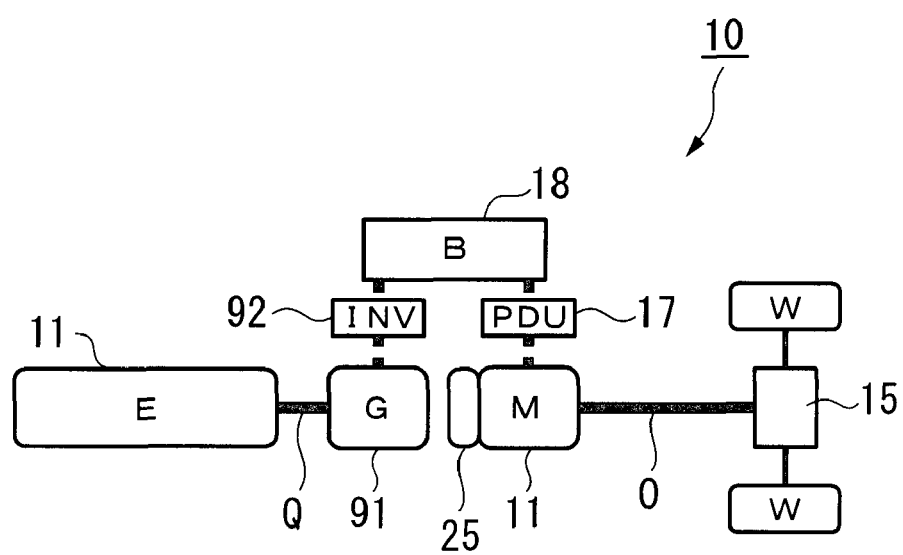
FIG. 20 is a block diagram of an electric-motor-equipped vehicle according to an eighth modification of the same embodiment.
Figure 22:
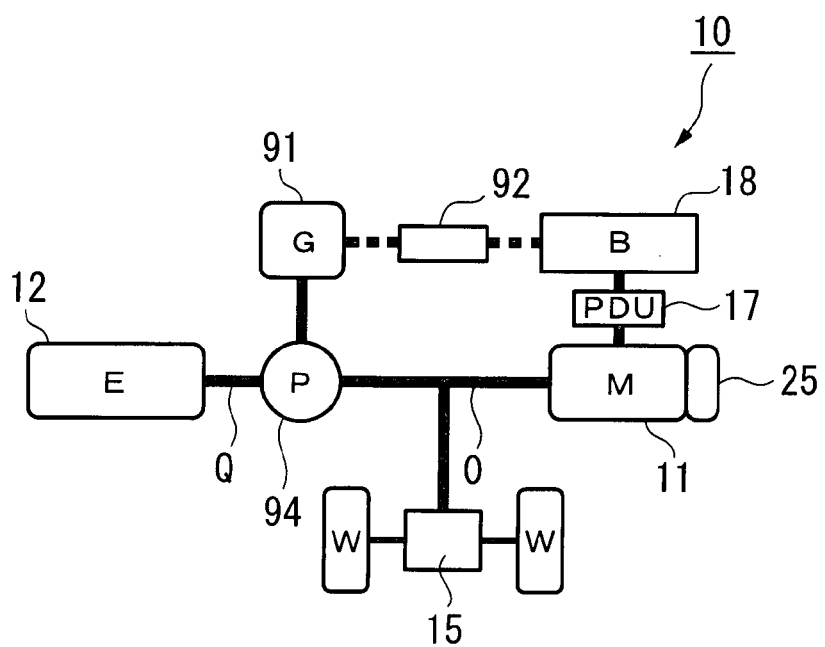
FIG. 22 is a block diagram of an electric-motor-equipped vehicle according to a tenth modification of the same embodiment.

In the vehicle 10 according to the aforementioned eighth modification shown in FIG. 20, the crank axis Q of the internal combustion engine (E) 12, the rotation axis O of the electric motor (M) 11, and the rotation axis T of the electric motor (G) 91 may be connected to a planetary gear mechanism (P) 94, as is the case with, for example, a vehicle 10 according to a tenth modification shown in FIG. 22.

Figure 23:
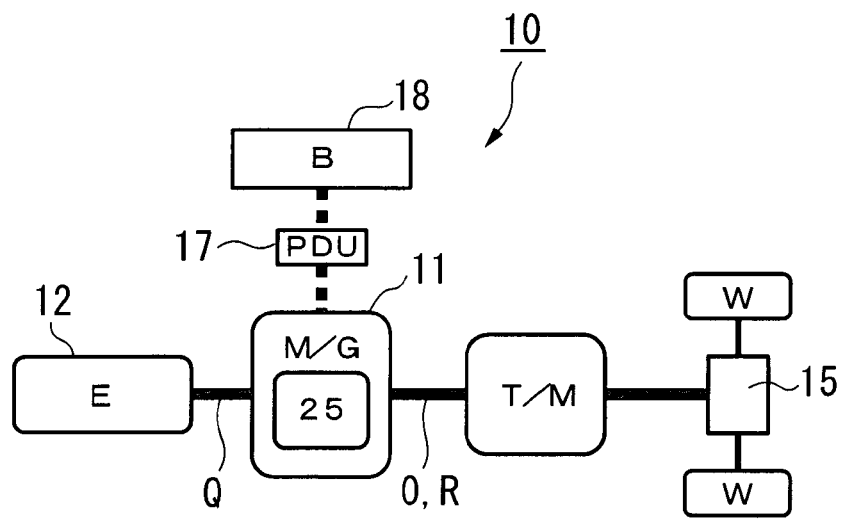
FIG. 23 is a block diagram of an electric-motor-equipped vehicle according to an eleventh modification of the same embodiment.

Furthermore, in the vehicle 10 according to the aforementioned embodiment, the clutch 13 and the motive force transmission mechanism 14 may be omitted, and the internal combustion engine (E) 12, the electric motor (M/G), and the transmission T/M may be connected in line with each other, as is the case with, for example, a vehicle 10 according to an eleventh modification shown in FIG. 23.

Figure 24:
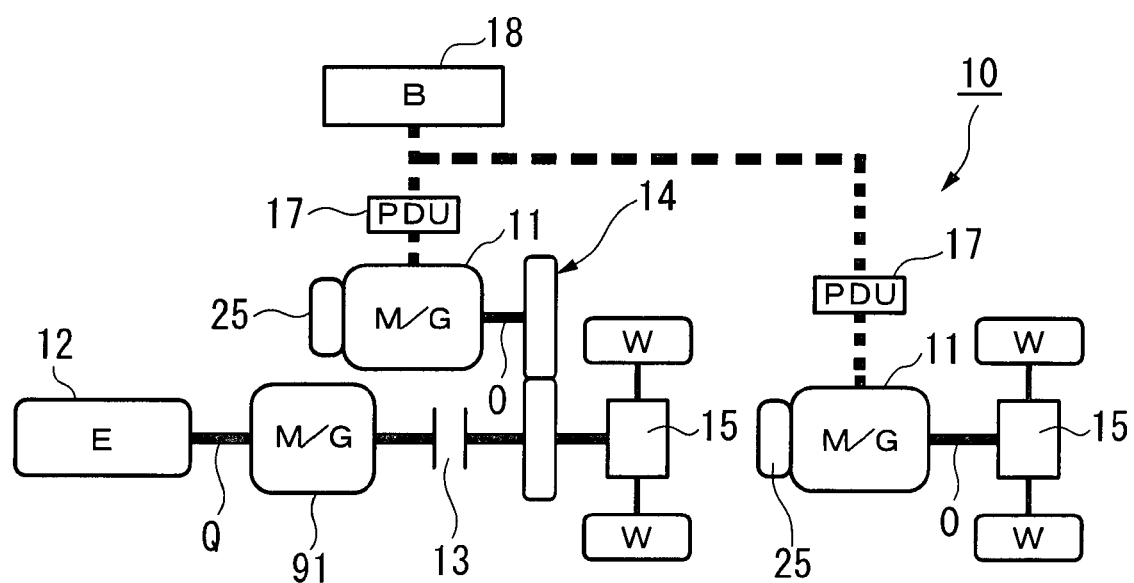
FIG. 24 is a block diagram of an electric-motor-equipped vehicle according to a twelfth modification of the same embodiment.

Furthermore, the vehicle 10 according to the aforementioned seventh modification shown in FIG. 19 may be configured such that a driving force from a second electric motor (M/G) 11, whose drive and regenerative operations are controlled by a second PDU 17 with the battery (B) 18 as its direct current source, and which is provided with a second phase control apparatus 25, is transmitted to other drive wheels W via a second differential 15, as is the case with, for example, a vehicle 10 according to a twelfth modification shown in FIG. 24.

In the vehicle 10 according to the aforementioned embodiment, the electric motor 11 may be provided as a starter motor and alternator for starting the internal combustion engine (E) 12.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the electric-motor-equipped vehicle of the present invention, for an electric motor which drives a vehicle or assists the driving of the vehicle by an internal combustion engine, the relative position between magnet pieces of an inner circumference side rotor and magnet pieces of an outer circumference side rotor can be modified with superior efficiency. As a result, the linkage flux amount with which a field flux by the magnet pieces of the outer circumference side rotor crosses a stationary part winding can be actively increased or decreased with superior efficiency by means of a field flux by the magnet pieces of the inner circumference side rotor. In addition, a state change between a field strengthening state and a field weakening state which is developed by the field flux of the magnet pieces of inner circumference side rotor with respect to the field flux of the magnet pieces of the outer circumference side rotor can be set steplessly, and hence an induced voltage constant of the electric motor can be steplessly changed to an appropriate value.

The invention claimed is:

1. An electric motor-equipped vehicle comprising:
an internal combustion engine serving as a driving source of a drive wheel on one of a front wheel side or a rear wheel side;
and an electric motor which is driven by a power supply from a storage apparatus and serves as a driving source for drive wheels on the other,
wherein the electric motor comprises:
an inner circumference side rotor and an outer circumference side rotor which are each provided with magnet pieces, and rotation axes of which are coaxially arranged;
a stator which is arranged on an outer circumferential side of the inner circumference side rotor and the outer circumference side rotor;
a phase modification device capable of modifying a relative phase between the inner circumference side rotor and the outer circumference side rotor,
wherein, in a state driving the drive wheels on the front wheel side and the rear wheel side, the phase modification device modifies a relative phase between the inner circumference side rotor and the outer circumference side rotor so that a mutually field strengthening state is developed by a field flux from the magnet pieces of the inner circumference side rotor and a field flux from the magnet pieces of the outer circumference side rotor, and
wherein in a state driving the drive wheels on the front wheel side or the rear wheel side, the phase modification device modifies a relative phase between the inner circumference side rotor and the outer circumference side rotor so that a mutually field weakening state is developed by a field flux from the magnet pieces of the inner circumference side rotor and a field flux from the magnet pieces of the outer circumference side rotor.

2. An electric motor-equipped vehicle comprising:
a first electric motor which is driven by a power supply from a storage apparatus and serves as a driving source of a drive wheel on one of a front wheel side or a rear wheel side; and
a second electric motor which is driven by a power supply from a storage apparatus and serves as a driving source of drive wheels on the other,
wherein at least either one of the first electric motor and the second electric motor comprises:
an inner circumference side rotor and an outer circumference side rotor which are each provided with magnet pieces, and rotation axes of which are coaxially arranged;
a stator which is arranged on an outer circumferential side of the inner circumference side rotor and the outer circumference side rotor; and
a phase modification device capable of modifying a relative phase between the inner circumference side rotor and the outer circumference side rotor,
wherein, in a state driving the drive wheels on the front wheel side and the rear wheel side, the phase modification device modifies a relative phase between the inner circumference side rotor and the outer circumference side rotor so that a mutually field strengthening state is developed by a field flux from the magnet piece of the inner circumference side rotor and a field flux from the magnet pieces of the outer circumference side rotor, and
wherein a state driving the drive wheels on the front wheel side or the rear wheel side, the phase modification device modifies a relative phase between the inner circumference side rotor and the outer circumference side rotor so that mutually field weakening state is developed by a field flux from the magnet pieces of the inner circumference side rotor and a field flux from the magnet pieces of the outer circumference side rotor.

3. An electric motor-equipped vehicle comprising:

a first electric motor which is driven by a power supply from a storage apparatus and serves, together with an internal combustion engine, as a driving source for drive wheels on one of a front wheel side or a rear wheel side; and a second electric motor which is driven by a power supply from a storage apparatus and serves as a driving source for drive wheels on the other, wherein at least either one of the first electric motor and the second electric motor comprises:

- an inner circumference side rotor and an outer circumference side rotor which are each provided with magnet pieces, and rotation axes of which are coaxially arranged;
- a stator which is arranged on an outer circumferential side of the inner circumference side rotor and the outer circumference side rotor; and
- a phase modification device capable of modifying a relative phase between the inner circumference side rotor and the outer circumference side rotor, wherein, in a state driving the drive wheels on the front wheel side and the rear wheel side, the phase modification device modifies a relative phase between the inner circumference side rotor and the outer circumference side rotor so that a mutually field strengthening state is developed by a field flux from the magnet pieces of the inner circumference side rotor and a field flux from the magnet pieces of the outer circumference side rotor, and wherein in a state driving the drive wheels on the front wheel side or the rear wheel side, the phase modification device modifies a relative phase between the inner circumference side rotor and the outer circumference side rotor so that a mutually field weakening state is developed by a field flux from the magnet pieces of the inner circumference side rotor and a field flux from the magnet pieces of the outer circumference side rotor.

* * * * *